(12) United States Patent
Yajima et al.

(10) Patent No.: US 12,172,515 B2
(45) Date of Patent: Dec. 24, 2024

(54) VALVE DEVICE

(71) Applicant: PIOLAX, INC., Kanagawa (JP)

(72) Inventors: Kazuki Yajima, Kanagawa (JP);
Takuma Kon, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 18/008,616

(22) PCT Filed: Jun. 10, 2021

(86) PCT No.: PCT/JP2021/022111
§ 371 (c)(1),
(2) Date: Dec. 6, 2022

(87) PCT Pub. No.: WO2021/256368
PCT Pub. Date: Dec. 23, 2021

(65) Prior Publication Data
US 2023/0249543 A1    Aug. 10, 2023

(30) Foreign Application Priority Data

Jun. 15, 2020 (JP) .................................. 2020-103241
Jan. 12, 2021 (JP) .................................. 2021-003107

(51) Int. Cl.
*B60K 15/03* (2006.01)
*B60K 15/035* (2006.01)
*F16K 24/04* (2006.01)

(52) U.S. Cl.
CPC .......... *B60K 15/035* (2013.01); *F16K 24/044* (2013.01); *B60K 2015/03289* (2013.01); *B60K 15/03519* (2013.01); *Y10T 137/3099* (2015.04)

(58) Field of Classification Search
CPC ........ F16K 31/18; F16K 31/24; F16K 24/044; F16K 24/04; F16K 24/06; F16K 27/07;
(Continued)

(56) References Cited

U.S. PATENT DOCUMENTS 1,161,877 A  *  11/1915  Nelson .................. F24D 19/081
                                                        236/62
6,058,963 A  *   5/2000  Enge .................. F02M 25/0809
                                                        137/202
(Continued)

FOREIGN PATENT DOCUMENTS

CN     116745516 A  *  9/2023
CN     118404976 A  *  7/2024 ............. B60K 15/04
(Continued)

OTHER PUBLICATIONS

Aug. 24, 2021, International Search Report issued for related PCT application No. PCT/JP2021/022111.
(Continued)

*Primary Examiner* — Craig J Price
(74) *Attorney, Agent, or Firm* — Paratus Law Group, PLLC

(57) ABSTRACT

A valve device includes: a housing; a float valve; and a float valve support portion. The float valve support portion includes a support wall, a side wall, a first slit formed in the support wall, a second slit formed in the side wall, and an elastic piece defined by the first slit and the second slit. The elastic piece includes a first extending portion extending along the side wall, and a second extending portion extending from the first extending portion and capable of coming into contact with a bottom surface of the float valve.

12 Claims, 19 Drawing Sheets

(58) Field of Classification Search

CPC ........ F16K 27/02; F16K 24/042; F16K 31/20; F16K 33/00; F16K 27/0209; F16K 24/00; F16K 31/22; F16K 1/36; F16K 15/023; F16K 15/021; F02M 37/00; F02M 37/017; F02M 37/0076; F02M 37/20; F02M 25/0836; B60K 15/035; B60K 2015/03289; B60K 15/03504; B60K 15/03519; B60K 15/03289; B60K 2015/03467; B60K 2015/03557; B60K 2015/03296; F16L 47/02; F16L 47/14; Y10T 137/053; Y10T 137/0753; Y10T 137/0777; Y10T 137/0874; Y10T 137/3099; Y10T 137/6004; Y10T 137/7358; Y10T 137/7423; Y10T 137/7426; Y10T 137/86324; Y10T 137/86332; B60Y 2306/09; G05D 7/0146; G05D 16/12; B67D 7/365

USPC ..... 137/15.26, 38, 39, 43, 315.08, 409, 429, 137/430, 587, 588, 202; 220/86.2, 745, 220/746; 141/59, 198, 202, 229; 123/516, 518, 198 D, 520

See application file for complete search history.

(56) References Cited

U.S. PATENT DOCUMENTS

| | | | | |
|---|---|---|---|---|
| 6,494,227 | B2* | 12/2002 | Hattori | F16K 24/044 137/202 |
| 6,561,211 | B2* | 5/2003 | Devall | F16K 24/044 137/202 |
| 6,688,330 | B1* | 2/2004 | Ehrman | B60K 15/03519 137/433 |
| 6,758,235 | B2* | 7/2004 | Frohwein | F16K 1/36 137/202 |
| 6,827,098 | B2* | 12/2004 | Sugiyama | F16K 24/044 137/202 |
| 6,854,477 | B2* | 2/2005 | Yamada | F16K 24/044 137/202 |
| 7,032,610 | B2* | 4/2006 | Matsuo | F16K 24/042 137/202 |
| 7,090,262 | B2* | 8/2006 | Kurihara | B29C 66/112 285/423 |
| 7,219,683 | B2* | 5/2007 | Furuya | F16K 17/196 137/198 |
| 8,171,952 | B2* | 5/2012 | Martin | F16K 24/044 137/198 |
| 8,220,481 | B2* | 7/2012 | Miura | F16K 24/044 137/202 |
| 8,365,756 | B2* | 2/2013 | Kobayashi | B60K 15/03519 137/202 |
| 8,365,757 | B2* | 2/2013 | Kobayashi | F16K 24/044 137/202 |
| 8,763,626 | B2* | 7/2014 | Cuvelier | F16K 24/044 137/202 |
| 9,518,671 | B2* | 12/2016 | Sui | F16K 27/02 |
| 10,041,601 | B2* | 8/2018 | Wada | F16K 27/0209 |
| 10,113,514 | B2* | 10/2018 | Wada | B60K 15/03519 |
| 10,267,275 | B2* | 4/2019 | Mihara | F02M 37/20 |
| 10,279,679 | B2* | 5/2019 | Wada | F02M 37/00 |
| 10,913,650 | B2* | 2/2021 | He | B67D 7/365 |
| 10,967,734 | B2* | 4/2021 | Sui | F02M 37/0023 |
| 11,009,147 | B2* | 5/2021 | Mihara | F16K 31/22 |
| 11,135,913 | B2* | 10/2021 | Mihara | F02M 37/0082 |
| 11,155,159 | B2* | 10/2021 | Okabayashi | B60K 15/03519 |
| 11,186,166 | B2* | 11/2021 | Iiduka | B60K 15/03519 |
| 11,299,387 | B2* | 4/2022 | Iino | B60K 15/03519 |
| 11,845,332 | B2* | 12/2023 | Yajima | B60K 15/03504 |
| 11,932,100 | B2* | 3/2024 | Yajima | B60K 15/03 |
| 2009/0071543 | A1* | 3/2009 | Vulkan | F16K 24/042 137/15.26 |
| 2015/0034174 | A1 | 2/2015 | Sui | |
| 2016/0355085 | A1 | 12/2016 | Ogose | |
| 2017/0072787 | A1* | 3/2017 | Mihara | F16K 24/044 |
| 2019/0113149 | A1 | 4/2019 | Mihara | |
| 2020/0031221 | A1 | 1/2020 | Sui et al. | |
| 2021/0138895 | A1 | 5/2021 | Mihara | |
| 2021/0157339 | A1 | 5/2021 | Mihara | |
| 2023/0144508 | A1* | 5/2023 | Kon | B60K 15/03519 137/202 |
| 2024/0255065 | A1* | 8/2024 | Kon | F02M 37/0029 |

FOREIGN PATENT DOCUMENTS

| | | |
|---|---|---|
| JP | 2013-147134 A | 8/2013 |
| JP | 2015-150935 A | 8/2015 |
| JP | 2019-074022 A | 5/2019 |
| WO | WO 2013/141220 A1 | 9/2013 |
| WO | WO 2018/168712 A1 | 9/2018 |
| WO | WO 2019/198596 A1 | 10/2019 |
| WO | WO 2020/100751 A1 | 5/2020 |

OTHER PUBLICATIONS

Aug. 24, 2021, International Search Opinion issued for related PCT application No. PCT/JP2021/022111.

Jul. 23, 2024, British Examination Report issued for related GB Application No. 2218406.3.

* cited by examiner

VALVE DEVICE

CROSS REFERENCE TO PRIOR APPLICATION

This application is a National Stage Patent Application of PCT International Patent Application No. PCT/JP2021/022111 (filed on Jun. 10, 2021) under 35 U.S.C. § 371, which claims priority to Japanese Patent Application Nos. 2020-103241 (filed on Jun. 15, 2020) and 2021-003107 (filed on Jan. 12, 2021), which are all hereby incorporated by reference in their entirety.

TECHNICAL FIELD

The present invention relates to a valve device, and more particularly to a valve device that is to be attached to a fuel tank of an automobile or the like and includes a float valve.

BACKGROUND ART

For example, a fuel tank of a vehicle such as an automobile is provided with a valve device (a cut valve) for suppressing a fuel in the fuel tank from leaking out of the fuel tank when the automobile turns or tilts, and a valve device (an overfill suppression valve) for suppressing overfilling of the fuel tank such that a liquid level in the fuel tank does not rise above a preset full-tank liquid level.

Such a valve device generally includes a housing and a float valve. The housing is formed with a ventilation chamber on an upper side and a valve chamber on a lower side by a partition wall having a ventilation hole, and the float valve is disposed in the valve chamber so as to be raised and lowered. When the float valve is lowered from a raised state, the float valve is brought into contact with a bottom surface of the housing, so that a hammering sound is generated. In order to suppress the hammering sound, there is a valve device provided with an elastic piece brought into contact with a bottom surface of a housing when a float valve is lowered.

As a valve device as described above, for example, Patent Literature 1 listed below describes a fuel tank valve device including a case having a ventilation valve port communicating with an outside of a tank and a fuel inflow portion, and a float body disposed in the case so as to be raised and lowered, in which an elastic piece is formed by a first arc-shaped split groove and a second arc-shaped split groove on a surface portion of the case facing a bottom portion of the float body, and a part of the elastic piece is brought into contact with the bottom portion of the float body.

CITATION LIST

Patent Literature

Patent Literature 1: WO2013/141220A1

SUMMARY OF INVENTION

Technical Problem

For example, when a fuel is supplied into a fuel tank, a fluid such as air or fuel vapor in the fuel tank is blown up and flows into a valve chamber, and thus the fluid may push up a float valve from a bottom surface side, causing the float valve to float. However, the float valve does not function as a cut valve, an overfill suppression valve, or the like when the float valve immediately floats during fuel supply or the like. Therefore, the float valve is set so as not to float when a flow rate of the fluid is equal to or less than a predetermined value.

In this regard, in the fuel tank device of Patent Literature 1, the first arc-shaped split groove and the second arc-shaped split groove are formed in the surface portion of the case facing the bottom portion of the float body in order to form the elastic piece. Therefore, there is a disadvantage that during fuel supply or the like, a fluid such as air is blown up and hits a bottom surface of a float in the case through the first and second arc-shaped split grooves, so that the float is likely to float.

Therefore, an object of the present invention is to provide a valve device capable of suppressing a hammering sound when a float valve is lowered and making the float valve less likely to float.

Solution to Problem

In order to achieve the above object, a valve device according to the present invention includes: a housing in which a valve chamber configured to communicate with an inside of a fuel tank on a lower side and a ventilation chamber configured to communicate with an outside of the fuel tank on an upper side are provided via a partition wall, and a valve hole configured to allow the valve chamber and the ventilation chamber to communicate with each other is formed in the partition wall; a float valve accommodated in the valve chamber so as to be raised and lowered, and configured to open and close the valve hole; and a float valve support portion provided on the housing and supporting the float valve. The float valve support portion includes a support wall facing a bottom surface of the float valve, a side wall erected from a peripheral edge of the support wall and facing a side surface of the float valve, a first slit formed in the support wall, a second slit formed in the side wall, and an elastic piece defined by the first slit and the second slit, and the elastic piece includes a first extending portion extending along the side wall, and a second extending portion extending from the first extending portion and capable of coming into contact with the bottom surface of the float valve.

Advantageous Effects of Invention

According to the present invention, when the float valve is lowered, the second extending portion of the elastic piece provided on the float valve support portion is brought into elastic contact with the bottom surface of the float valve, and thus it is possible to suppress a hammering sound when a float valve is lowered. The second slit is formed in the side wall, and the support wall is formed with the first slit alone, and thus an opening region of the support wall can be narrowed. As a result, when a fluid is blown up during fuel supply or the like, pushing-up due to the fluid from a bottom surface side of a float in the housing is suppressed, and thus it is possible to make the float valve less likely to float.

DESCRIPTION OF EMBODIMENTS

Figure 3:
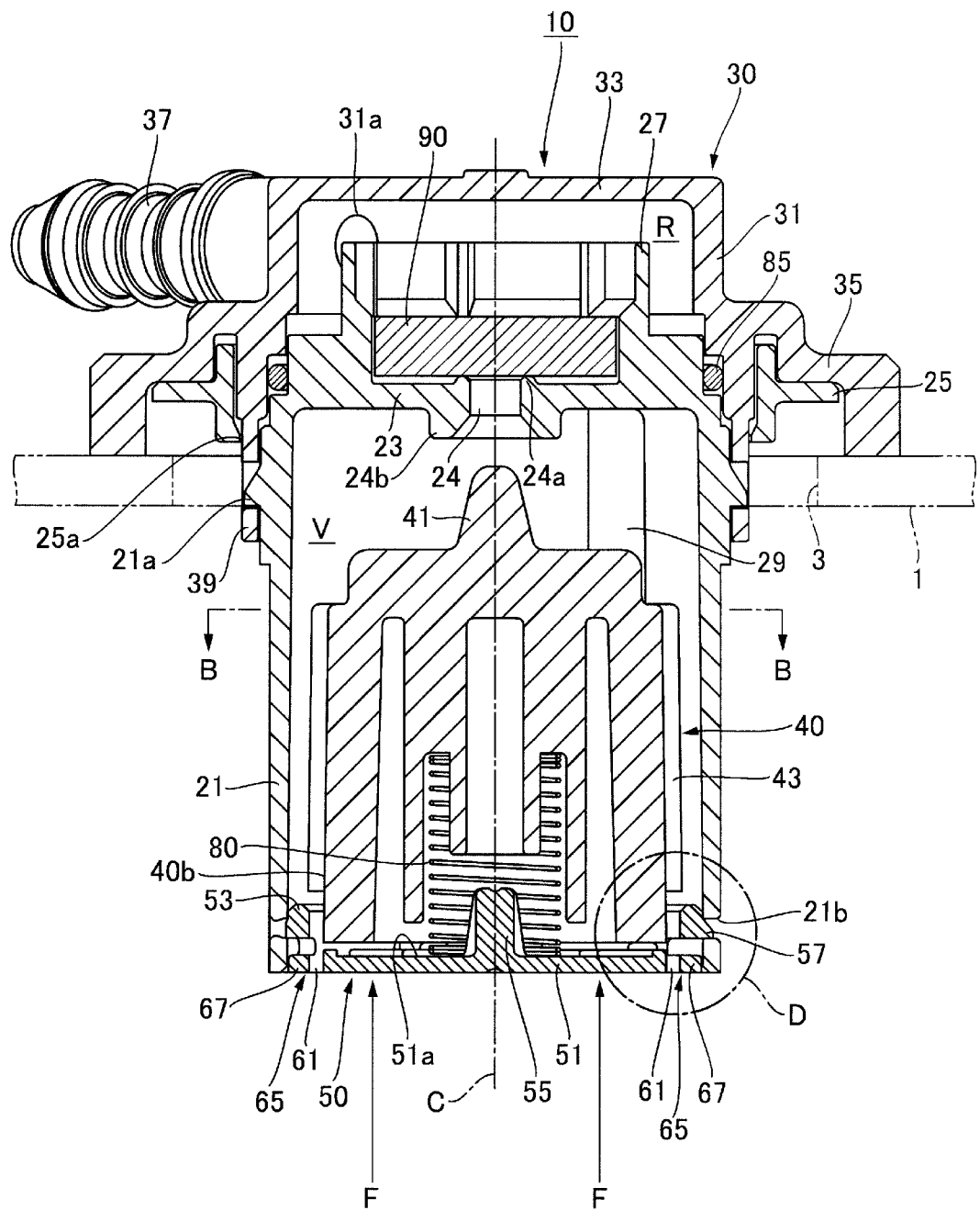
FIG. 3 is a cross-sectional view taken along a line A-A in FIG. 2.

Hereinafter, an embodiment of a valve device according to the present invention will be described with reference to the drawings. In the following description, the term "fuel" means a liquid fuel (including fuel droplets), and the term "fuel vapor" means an evaporated fuel. As shown in FIG. 3, a valve device 10 in the embodiment is a fuel tank valve device to be attached to a fuel tank 1 of a vehicle such as an automobile.

Figure 1:
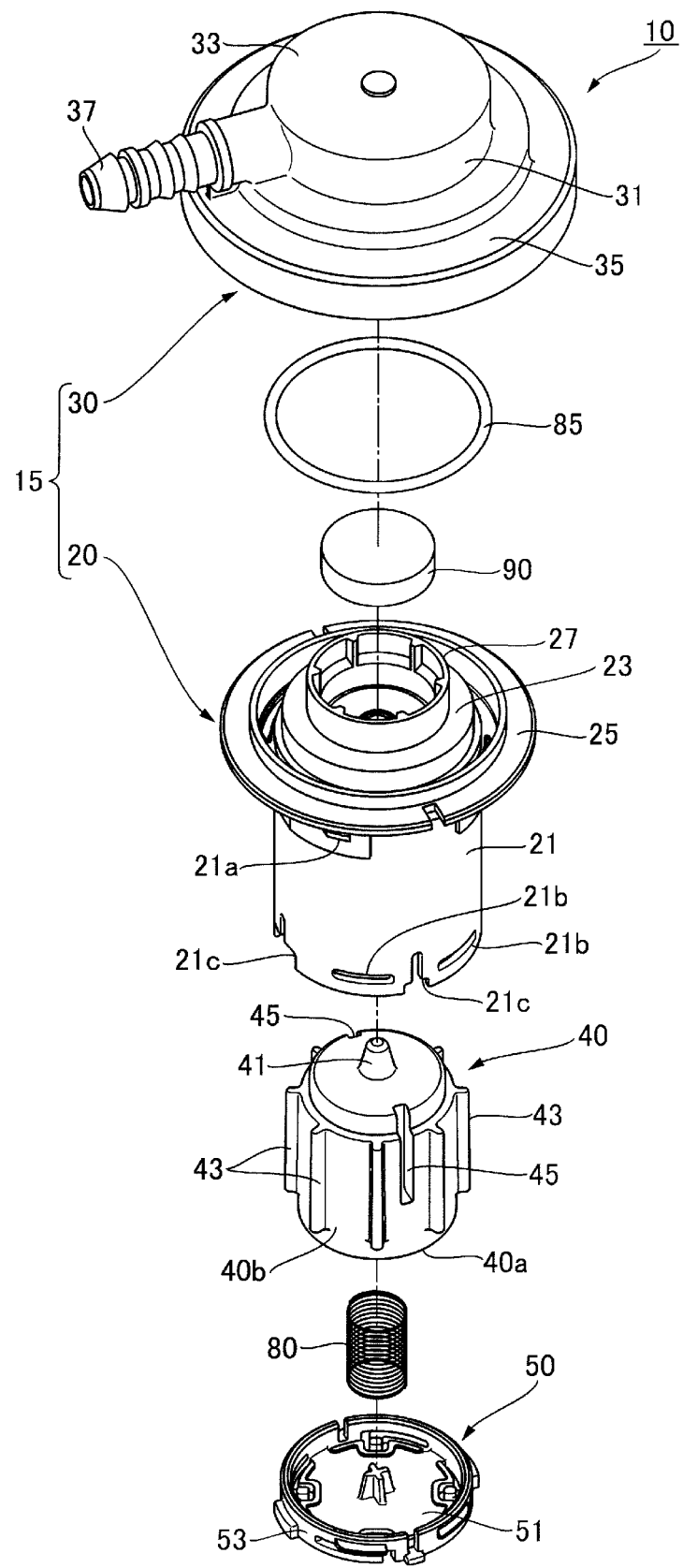
FIG. 1 is an exploded perspective view showing an embodiment of a valve device according to the present invention.

As shown in FIG. 1, the valve device 10 according to the embodiment has a substantially cylindrical shape and includes a housing 15. The housing 15 includes a housing main body 20 provided with a partition wall 23 on an upper side, and a cover 30 mounted on an upper side of the housing main body 20. As shown in FIG. 3, a valve chamber V communicating with an inside of the fuel tank 1 on a lower side and a ventilation chamber R communicating with an outside of the fuel tank 1 on an upper side are provided in the housing 15 via the partition wall 23. A float valve 40 provided with a valve head 41 on an upper side is accommodated in the valve chamber V so as to be raised and lowered. Further, a float valve support portion 50 that supports the float valve 40 is provided on the housing 15.

As shown in FIGS. 1 and 3, the housing main body 20 includes a peripheral wall 21 having a substantially cylindrical shape, and the partition wall 23 having a substantially disk shape is disposed on an upper side of the peripheral wall 21. The partition wall may be provided, for example, in the middle of the peripheral wall 21 of the housing main body 20 in an axial direction, and a shape of the partition wall may be simply a disk shape, or may be a shape in which a central portion is raised in a cylindrical shape and a wall portion (a shoulder wall portion) provided at a peripheral edge portion has a stepped shape. The position and the shape of the partition wall are not particularly limited.

A flange portion 25 extends outward from an upper outer peripheral edge of the peripheral wall 21. A plurality of insertion holes 25a are formed in an inner peripheral side of the flange portion 25 (see FIG. 3). Further, locking protrusions 21a protrude at positions near an upper side of the peripheral wall 21 and aligned with the insertion holes 25a (see FIG. 3). A plurality of locking holes 21b are formed in a lower side of the peripheral wall 21. Further, a plurality of cutout portions 21c are formed in a lower peripheral edge portion of the peripheral wall 21.

The cover 30 has a substantially hat shape, and includes a substantially cylindrical peripheral wall 31, a ceiling wall 33 closing an upper portion of the peripheral wall 31, and a flange portion 35 annularly extending from a lower peripheral edge of the peripheral wall 31. A fuel vapor discharge port 31a (see FIG. 3) is formed at a predetermined position of the peripheral wall 31, and a fuel vapor pipe 37 having a substantially cylindrical shape extends outward from an outer peripheral edge portion of the fuel vapor discharge port 31a. A tube (not shown) communicating with a canister or the like disposed outside the fuel tank 1 is connected to the fuel vapor pipe 37. A plurality of locking pieces 39 extend from a lower end portion of the peripheral wall 31. As shown in FIG. 3, the valve device 10 can be attached to the fuel tank 1 by fixing a lower end portion of the flange portion 35 to a front peripheral edge of an attachment hole 3 of the fuel tank 1 by welding or the like.

In a state where a seal ring 85 is mounted on an upper outer periphery of the peripheral wall 21 of the housing main body 20, the cover 30 is covered from above to sandwich the seal ring 85, and the locking pieces 39 of the cover 30 are inserted from the insertion holes 25a of the housing main body 20 and locked to the locking protrusions 21a, respectively, so that the cover 30 is attached to the upper side of the housing main body 20. As a result, via the partition wall 23, the ventilation chamber R communicating with the outside of the fuel tank is formed on the upper side (see FIG. 3).

Returning to description of the housing main body 20, as shown in FIG. 3, at a center of the partition wall 23, a valve hole 24 having a circular hole shape is formed so as to penetrate the partition wall 23. The valve chamber V and the ventilation chamber R communicate with each other through the valve hole 24.

An accommodating portion 27 having a substantially cylindrical frame shape opened upward protrudes from a surface (a front surface) of the partition wall 23 on a ventilation chamber R side. Further, a first valve seat 24a protrudes upward from a peripheral edge of the valve hole 24 on the ventilation chamber R side. A second valve seat 24b protrudes downward from the peripheral edge of the valve hole 24 on a valve chamber V side.

Further, a substantially disk-shaped pressure adjusting valve 90 (hereinafter, also simply referred to as the "adjusting valve 90") for adjusting a pressure of the fuel tank 1 is accommodated in the accommodating portion 27 so as to be raised and lowered. The adjusting valve 90 opens and closes the valve hole 24 by coming into contact with and separating from the first valve seat 24a thereby adjusting the pressure in the fuel tank 1. On the other hand, the float valve 40 is brought into contact with and separated from the second valve seat 24b (here, the valve head 41 is brought into contact with and separated from the second valve seat 24*b*) to open and close the valve hole 24, thereby suppressing a fuel from flowing out.

Figure 9:
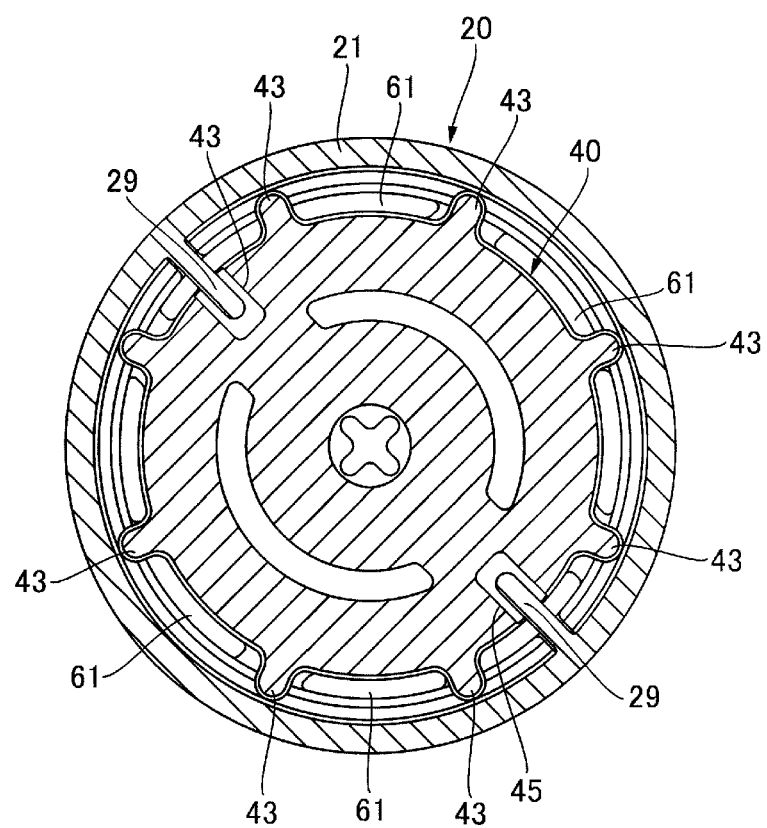
FIG. 9 is a cross-sectional view taken along a line B-B in FIG. 3.

Further, as shown in FIG. 9, a pair of thin plate-like protruding pieces 29 and 29 protrude toward a center of the housing 15 from two positions on an inner periphery of the peripheral wall 21 facing each other in a peripheral direction. The protruding piece 29 extends along an axial direction of the housing 15 (meaning a direction along an axial center C1 of the housing 15, see FIG. 3).

As shown in FIG. 1, in the float valve 40 disposed in the valve chamber V of the housing 15 so as to be raised and lowered, as described above, the valve head 41 protrudes from an upper center, and guide ribs 43 extending along an axial direction of the float valve 40 from an outer periphery thereof are provided radially at equal intervals in the peripheral direction. Further, a pair of groove portions 45 and 45 are formed along the axial direction of the float valve 40 at two positions on an outer periphery of the float valve 40 aligned in the peripheral direction. The pair of protruding pieces 29 and 29 provided on an inner periphery of the housing are inserted into the pair of groove portions 45 and 45 (see FIG. 9). As a result, rotation of the float valve 40 with respect to the housing 15 can be restricted while the float valve 40 can be raised and lowered in the axial direction.

That is, in the embodiment, the protruding piece 29 on a housing 15 side and the groove portion 45 on a float valve 40 side are provided between the housing and the float valve 40 in the present invention, and form a "rotation restricting portion" for restricting the rotation of the float valve. The rotation restricting portion may include, for example, a groove portion provided on a housing side and a protrusion provided on a float valve side and slidably inserted into the groove portion, and is not particularly limited.

Next, the float valve support portion 50 will be described with reference to FIGS. 5 to 8.

The float valve support portion 50 (hereinafter, also simply referred to as the "support portion 50") in the embodiment is separate from the housing 15. The support portion 50 includes a support wall 51 supporting the float valve 40, and a side wall 53 erected from a peripheral edge of the support wall 51. The support wall 51 is disposed to face a bottom surface 40*a* of the float valve 40, and the side wall 53 is disposed to face a side surface 40*b* (see FIGS. 1 and 3) of the float valve 40 (see FIG. 3).

Figure 5:
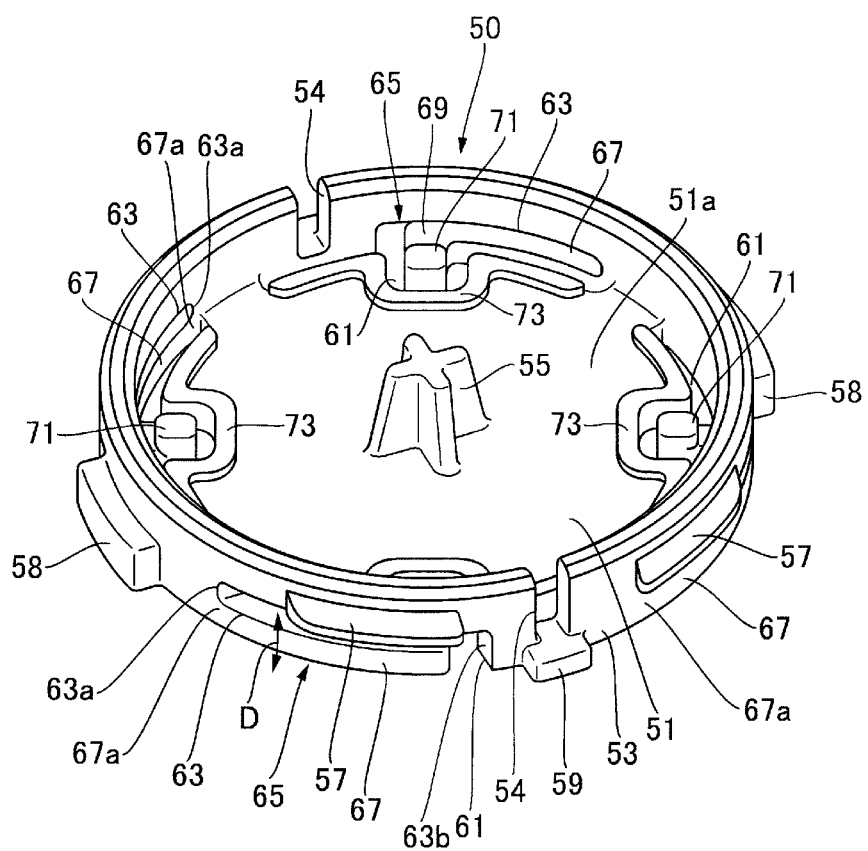
FIG. 5 is a perspective view of a float valve support portion constituting the same valve device.

In a case of the embodiment, the support wall 51 has a substantially disk shape, and the side wall 53 having a substantially cylindrical shape is erected from an outer peripheral edge of the support wall 51. A spring support seat 55 having a protrusion shape with a cruciform cross section protrudes from a center of an inner surface 51*a* of the support wall 51 (a surface facing the bottom surface 40*a*, of the float valve 40). The spring support seat 55 is inserted into an inner periphery of a lower end portion of an urging spring 80 to support the urging spring 80. Further, a plurality of locking claws 57 protrude from an upper side of an outer periphery of the side wall 53. A pair of rotation restricting protrusions 58 and 58 and a pair of rotation restricting protrusions 59 and 59 provided at positions orthogonal to the rotation restricting protrusions 58 and 58 protrude from a lower side of the outer periphery of the side wall 53. The rotation restricting protrusion 59 is narrower than the rotation restricting protrusion 58. Further, as shown in FIG. 5, a pair of cutouts 54 and 54 extending along an erecting direction of the side wall 53 are formed at positions facing each other in a peripheral direction of the side wall 53 and aligned with the pair of narrow rotation restricting protrusions 59 and 59.

Figure 2:
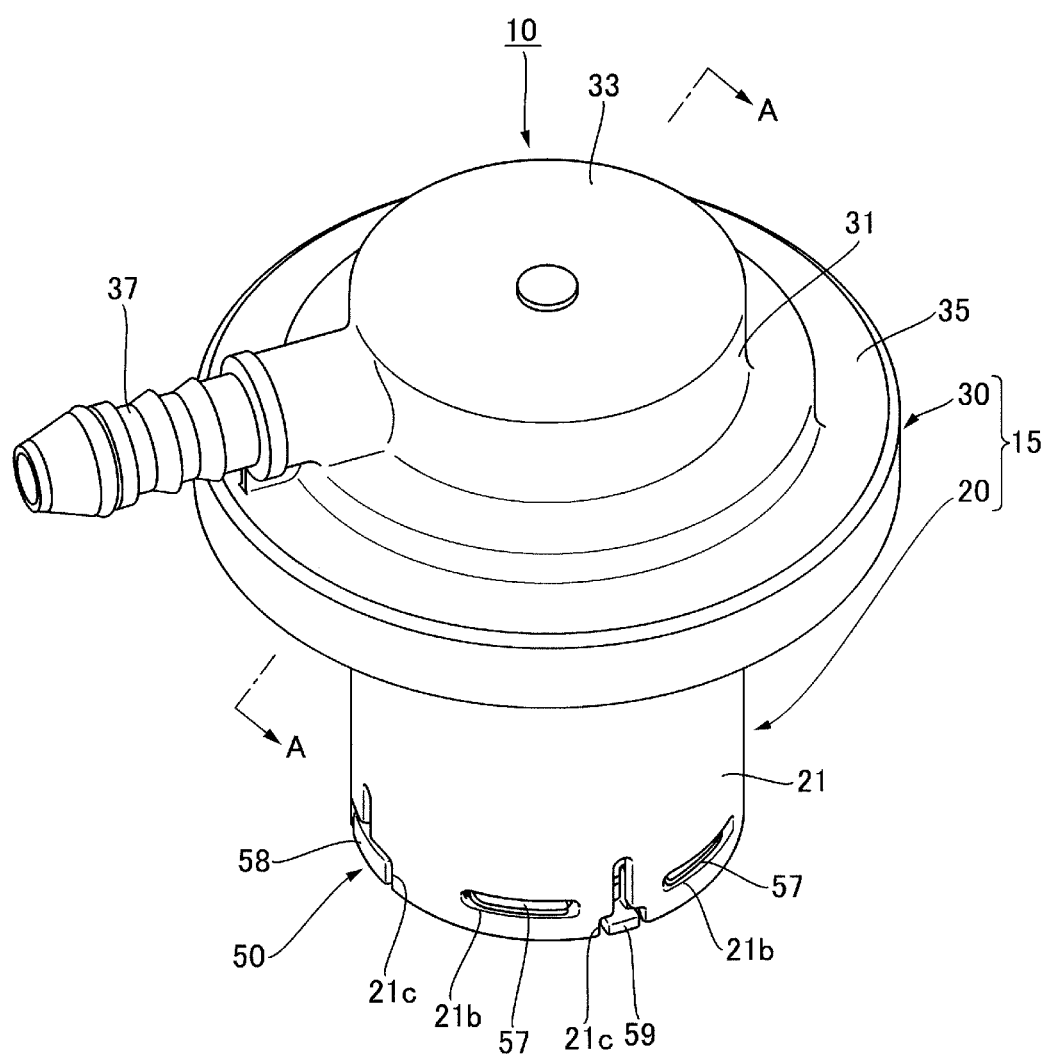
FIG. 2 is a perspective view of the same valve device.

The locking claws 57 of the support portion 50 are locked to the locking holes 21*b* of the housing main body 20, respectively, and the rotation restricting protrusions 58 and 59 of the support portion 50 are fitted to the cutout portions 21*c* of the housing main body 20, respectively, so that the support portion 50 is mounted under the housing main body 20 in a state where the support portion 50 is retained and rotation thereof is restricted (see FIG. 2). As a result, as shown in FIG. 3, the valve chamber V communicating with the inside of the fuel tank 1 is formed in the lower portion of the housing via the partition wall 23, and the float valve 40 is disposed in the upper side of the valve chamber V via the urging spring 80 so as to be raised and lowered (see FIG. 3).

As shown in FIGS. 5 to 8, the support portion 50 includes first slits 61 formed in the support wall 51, second slits 63 formed in the side wall 53, and elastic pieces 65 each defined by the first slit 61 and the second slit 63. That is, the elastic piece 65 is formed so as to partition a predetermined portion of the support portion 50 (here, a predetermined range of a connection portion between the support wall 51 and the side wall 53) by the first slit 61 and the second slit 63. It can be said that the elastic piece 65 in the embodiment is formed so as to be deflectable and deformable via the first slit 61 and the second slit 63, the first slit 61 formed in the support wall 51 and an inner periphery of the side wall 53, and the second slit 63 formed in the side wall 53 so as to overlap with the first slit 61 (to be in an overlapping position). The elastic piece 65 elastically abuts against the bottom surface 40*a* of the float valve 40 (hereinafter, also simply referred to as "elastic contact").

Further, the elastic piece 65 includes a first extending portion 67 extending along the side wall 53, and a second extending portion 69 extending from the first extending portion 67 and capable of coming into contact with the bottom surface 40*a* of the float valve 40. More specifically, the elastic piece 65 in the embodiment includes the first extending portion 67 whose base end 67*a* is connected to the side wall 53 and Which extends from the base end 67*a* in the peripheral direction of the side wall 53 via the first slit 61 and the second slit 63, and the second extending portion 69 extending on an inner diameter side with respect to the side wall 53 so as to enter the first slit 61 from a tip end 67*b* of the first extending portion 67 and capable of coming into contact with the bottom surface 40*a* of the float valve 40. In the embodiment, the tip end 67*b* of the second extending portion 69 is a free end, and enters the first slit 61.

Figure 6:
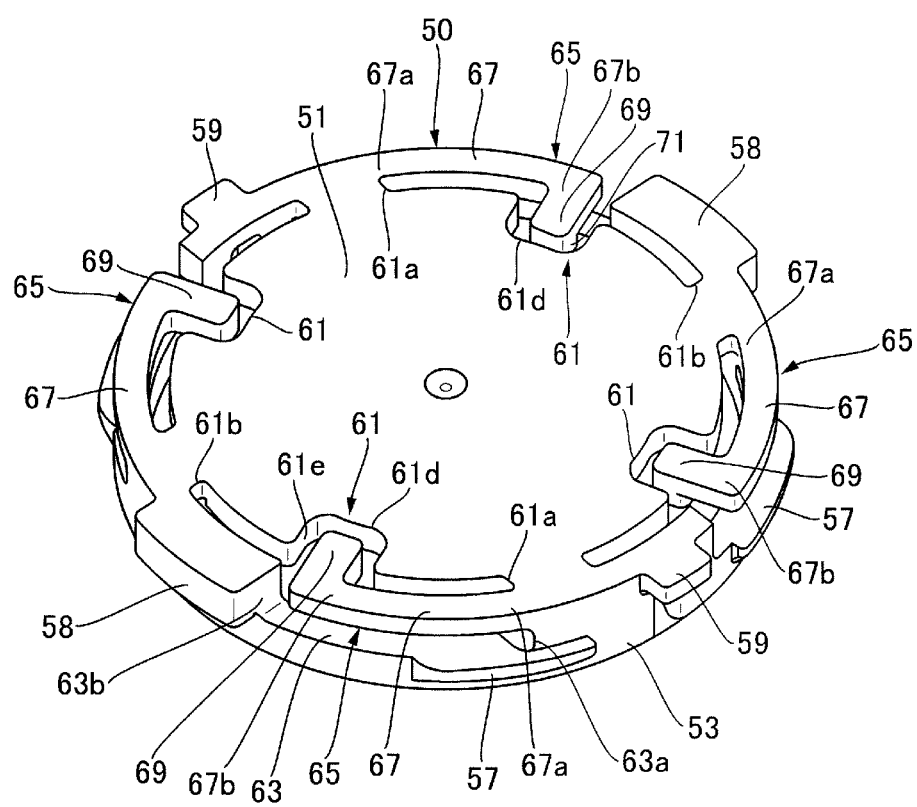
FIG. 6 is a perspective view of the same float valve support portion as viewed from a direction different from that of FIG. 5.
Figure 7:
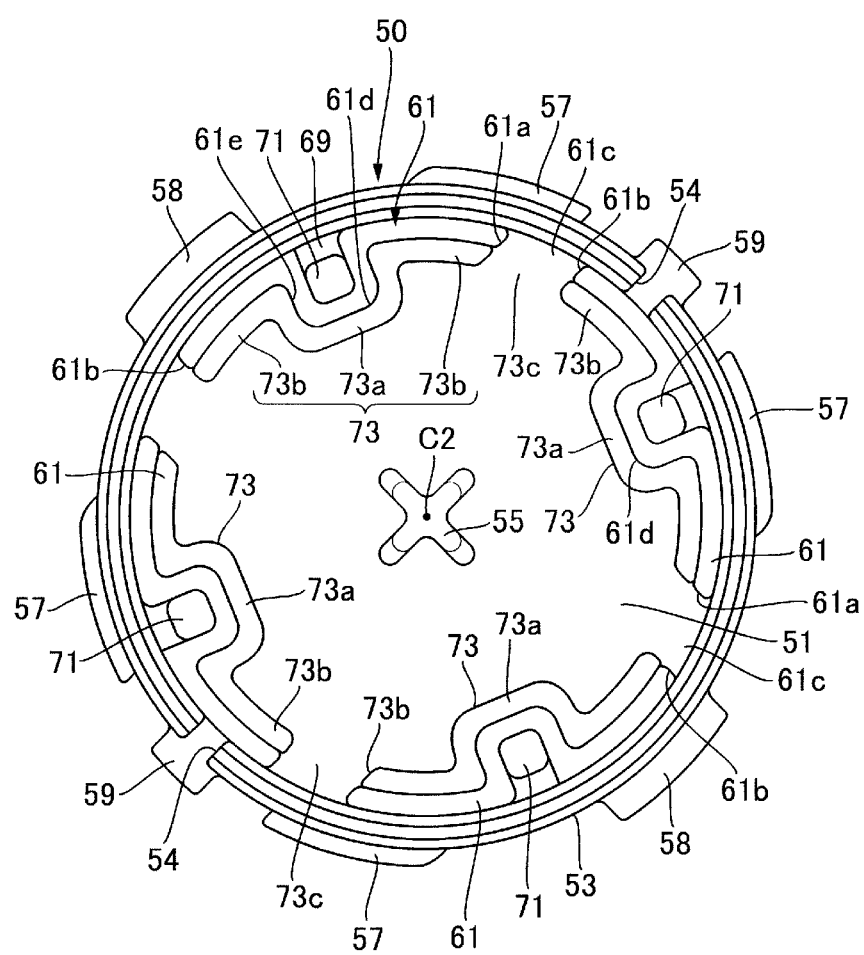
FIG. 7 is a plan view of the same float valve support portion.
Figure 8:
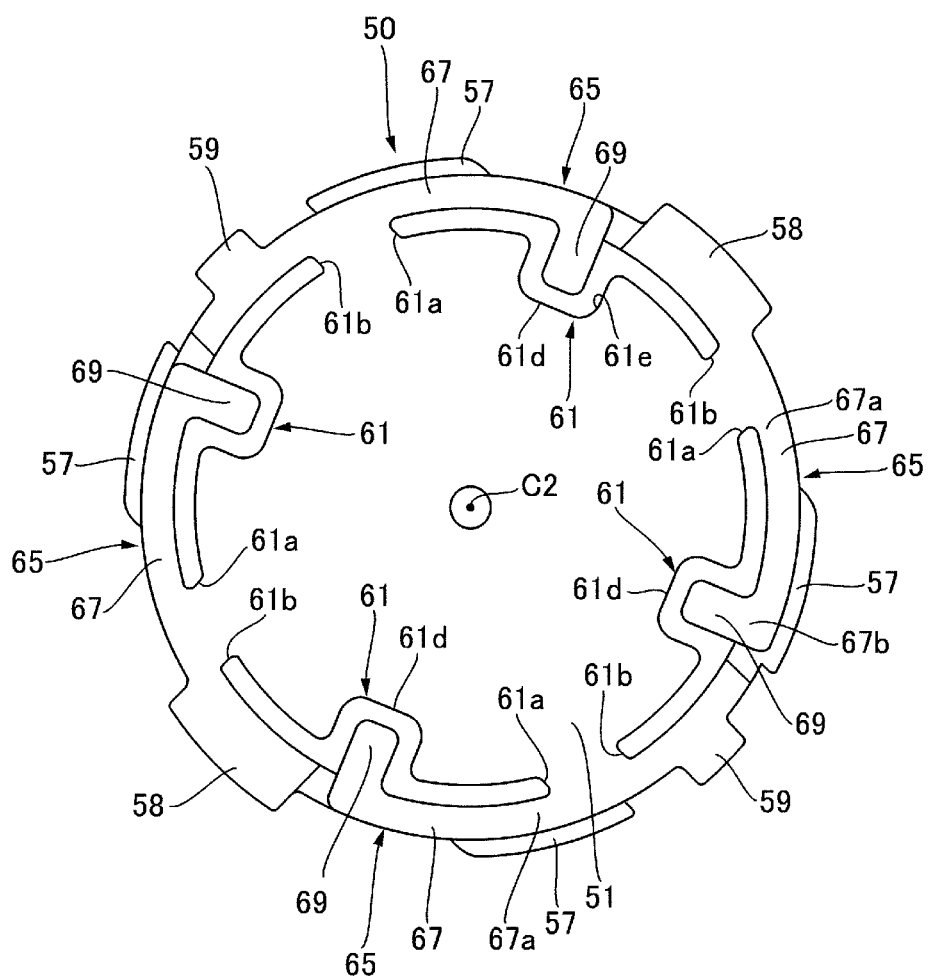
FIG. 8 is a bottom view of the same float valve support portion.

Further, as shown in FIGS. 6 to 8, the first slit 61 extends in the support wall 51 and along the inner periphery of the side wall 53 so as to form a substantially fan shape with a constant width. The first slit 61 penetrates the support wall 51 in a thickness direction thereof, and allows an inner surface 51*a* side and an outer surface side of the support wall 51 to communicate with each other. That is, the first slit 61 forms the elastic piece 65 in cooperation with the second slit 63, and at the same time serves as a flow path for a fluid such as air from below the valve device 10. In the embodiment, a plurality of (here, four) first slits 61 are formed in the support wall 51 and the inner periphery of the side wall 53 at equal intervals in the peripheral direction. According to the number of the first slits 61, a plurality of second slits 63 and a plurality of elastic pieces 65 are also formed (here, four). The first slit 61 in the embodiment extends in the support wall 51 and along the inner periphery of the side wall 53, but the first slit may be formed so as to deviate to an inner diameter direction side of the support wall 51 from the inner periphery of the side wall 53.

Further, as shown in FIG. 7, a gap 61c is formed between one end 61a in an extending direction of a predetermined first slit 61 and another end 61b in an extending direction of the adjacent first slit 61 in the peripheral direction. A cutout portion 61d is formed from a predetermined position of the first slit 61 in the peripheral direction (here, a center in the peripheral direction) toward the inner diameter direction side of the support wall 51 (here, toward a center C2 of the support wall 51). The second extending portion 69 constituting the elastic piece 65 enters the cutout portion 61d, and an outer periphery of the second extending portion 69 is surrounded by the cutout portion 61d (see FIGS. 7 and 8).

The first slit 61 extends beyond the second extending portion 69. That is, as shown in FIGS. 7 and 8, the second extending portion 69 of the elastic piece 65 enters the cutout portion 61d of the first slit 61 as described above, and the first slit 61 further extends beyond the cutout portion 61d. A portion of the first slit 61 extending beyond the cutout portion 61d (a portion extending from the cutout portion 61d to the another end 61b) does not contribute to the formation of the elastic piece 65, but serves to widen a ventilation hole formed by the first slit 61.

On the other hand, as shown in FIG. 5, the second slit 63 is formed so as to overlap with the first slit 61 along the peripheral direction of the side wall 53 from a position away from an upper end surface 53a of the side wall 53 by a predetermined length.

Referring also to FIG. 6, one end 63a in an extending direction of the second slit 63 is disposed at a position substantially aligned with the one end 61a of the first slit 61 (see the second slit 63 on a front side of a paper surface of FIG. 6), and the second slit 63 extends from the one end 63a along the peripheral direction of the side wall 53 to a position overlapping with the first slit 61 and reaching another side surface 61e (see FIG. 6) of the cutout portion 61d of the first slit 61. That is, another end 63b in the extending direction of the second slit 63 is aligned with the another side surface 61e of the cutout portion 61d of the first slit 61. It can also be said that the second slit 63 extends in the same direction as the extending direction of the first slit 61. Further, as shown in FIG. 5, the another end 63b of the second slit 63 located on the another side surface 61e of the cutout portion 61d of the first slit 61 is cut out so as to communicate with the first slit 61. The second slit 63 penetrates the side wall 53 in a radial direction to allow an inside and an outside of the side wall 53 to communicate with each other.

As shown in FIGS. 5 and 6, the first extending portion 67 constituting the elastic piece 65 is connected to the side wall 53 such that a base end 67a in an extending direction of the first extending portion 67 is located on the one end 61a of the first slit 61 and the one end 63a of the second slit 63, and extends along the peripheral direction of the side wall 53. The second extending portion 69 extends from the inner periphery of the side wall 53 toward the inner diameter direction side of the support wall 51 (here, toward the center C2 of the support wall 51) so as to enter the cutout portion 61d of the first slit 61 from the tip end 67b in the extending direction of the first extending portion 67.

That is, in the elastic piece 65 in the embodiment, the base end 67a of the first extending portion 67 is a fixed end connected to the side wall 53, the first extending portion 67 is a band-shaped piece extending in a substantially arc shape, the second extending portion 69 is bent so as to be substantially orthogonal to the tip end 67b of the first extending portion 67, the second extending portion 69 is a free end, and the elastic piece 65 is mainly deflectable and deformable in the axial direction of the housing 15 as indicated by an arrow D in FIG. 5.

Figure 10:
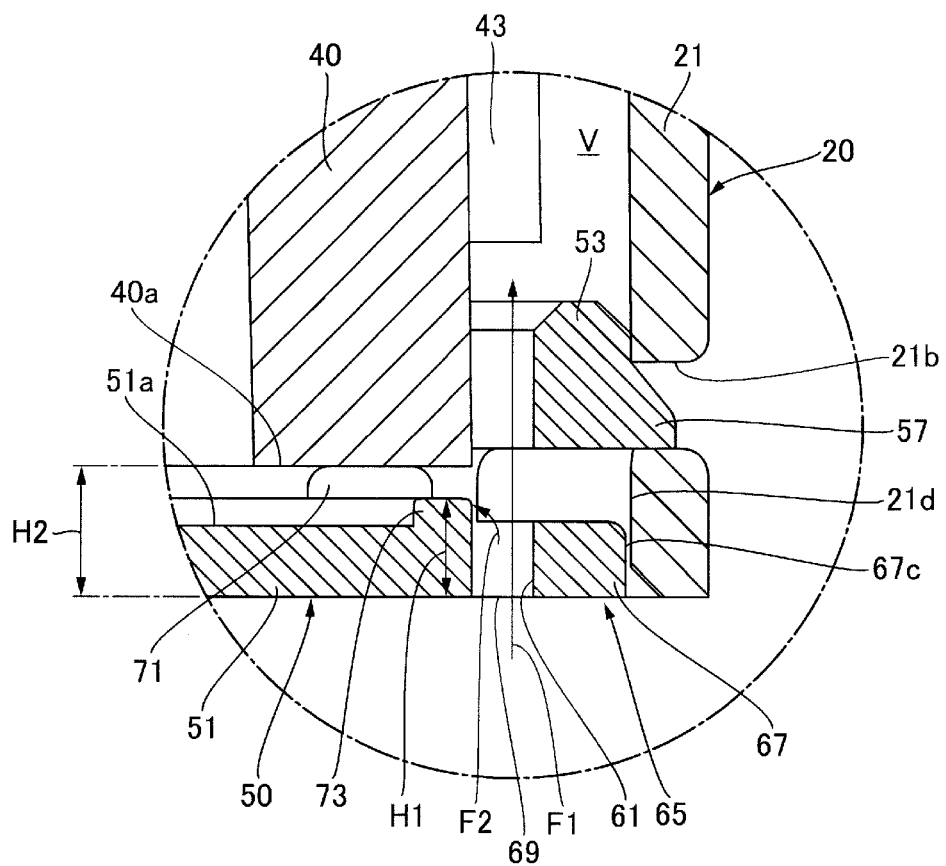
FIG. 10 is an enlarged cross-sectional view of a portion D in FIG. 3.

A protrusion 71 protrudes from an inner surface of a tip end portion of the second extending portion 69 toward the valve chamber V side formed in the housing. As shown in FIG. 10, the protrusion 71 is brought into elastic contact with the bottom surface 40a of the float valve 40.

The elastic piece 65 has the following relationship with the first slit 61 and the second slit 63. That is, the second slit 63 is located on an upper surface side of the first extending portion 67 of the elastic piece 65 (see FIG. 5), the first slit 61 is located on a radially inner side of the first extending portion 67 (see FIG. 8), and the cutout portion 61d of the first slit 61 is located so as to surround the outer periphery of the second extending portion 69 of the elastic piece 65 (see FIG. 8). Other than the first slit 61, the support wall 51 is not formed with other flow paths such as slits, openings, and cutouts through which a fluid can flow and which allow an inside and an outside of the support wall 51 to communicate with each other.

Further, as shown in FIGS. 5 and 7, the support wall 51 is provided with a rib 73 protruding toward the valve chamber V side and extending along an inner edge portion of the first slit 61. The rib 73 in the embodiment includes a first rib 73a protruding from an inner edge portion of the cutout portion 61d of the first slit 61 and having a substantially U shape as viewed from a planar direction, and a pair of second ribs 73b and 73b protruding from both ends of the first rib 73a along the inner edge portion of the first slit 61. However, the rib 73 is not provided on the one end 61a and the another end 61b of the first slit 61, and both ends of the rib 73 are not connected to the side wall 53.

As shown in FIG. 7, a gap 73c is formed between the ribs 73 and 73 adjacent to each other in the peripheral direction, that is, between the second rib 73b on one side in a peripheral direction of a predetermined rib 73 and the second rib 73b on the other side in a peripheral direction of the adjacent rib 73. The gap 73c communicates with the gap 61c formed between the adjacent first slits 61 and 61.

As shown in FIG. 10, a height H1 of the rib 73 (a distance from an outer surface of the support wall 51 to an upper surface of the rib 73) is smaller than a height H2 of the protrusion 71 (a distance from an outer surface of the elastic piece 65 to an upper surface of the protrusion 71), and the rib 73 is normally not brought into contact with the bottom surface 40a of the float valve 40.

The support portion 50 is provided separately from the housing 15, and as shown in FIG. 10, the support portion 50 is attached to the housing 15 such that an outer peripheral surface 67c of the elastic piece 65 faces an inner peripheral surface 21d of the housing 15. That is, the support portion 50 in the embodiment is formed separately from the housing main body 20, and as described above, is attached to a lower opening of the housing main body 20 in a rotation restricted state via the plurality of locking claws 57 and the rotation restricting protrusions 58 and 59 (see FIG. 3). At this time, as shown in FIG. 10, the side wall 53 of the support portion 50 is inserted and disposed in the peripheral wall 21, and the outer peripheral surface 67c of the elastic piece 65 formed by connection with the side wall 53 faces the inner peripheral surface 21d of the peripheral wall 21 of the housing main body 20 constituting the housing 15.

Figure 4:
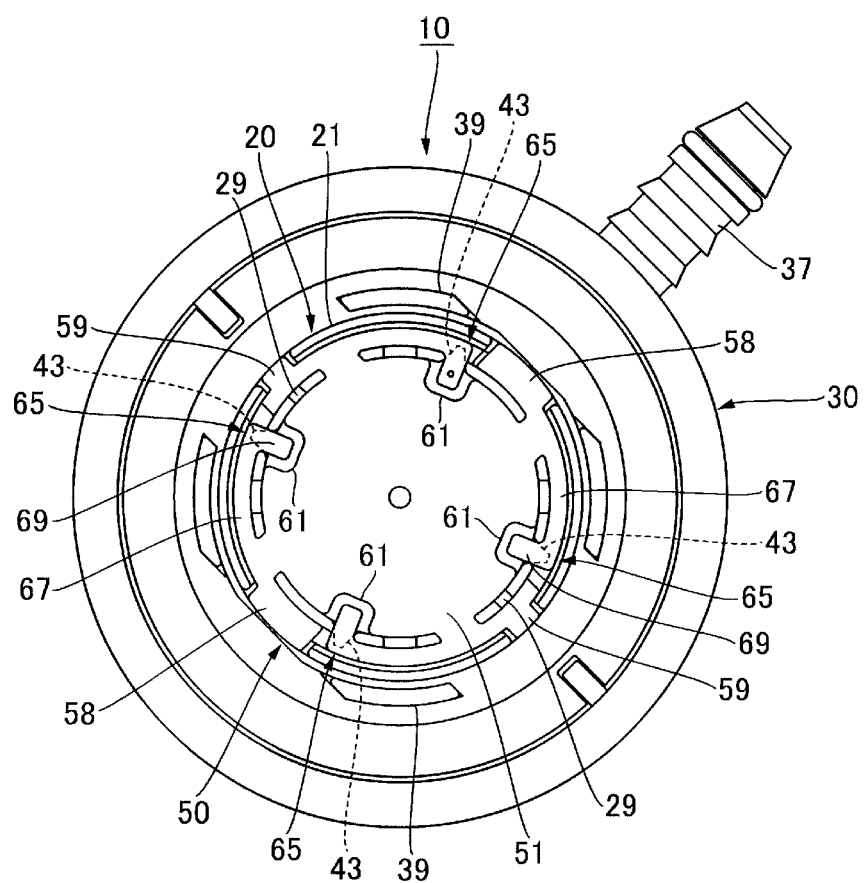
FIG. 4 is a bottom view of the same valve device.

As described above, the rotation restricting portion (here, the protruding piece 29 on the housing 15 side and the groove portion 45 on the float valve 40 side) that restricts the rotation of the float valve 40 is provided between the housing 15 and the float valve 40, and further, the guide rib 43 extending along the axial direction of the float valve 40 is provided on the outer periphery of the float valve 40. In a state where the rotation of the float valve 40 is restricted by the rotation restricting portion, as shown in FIG. 4, the guide rib 43 is disposed so as to overlap with the second extending portion 69 when the support portion 50 is viewed from a bottom surface side of the valve device 10 (when viewed from a lower end side in an axial direction of the valve device 10). That is, as shown in FIG. 4, the pair of protruding pieces 29 and 29 of the float valve 40 are visible from the first slit 61, but the guide rib 43 of the float valve 40 is invisible from the first slit 61 and is hidden, and is located on an inner diameter side with respect to the inner edge portion of the first slit 61. Also, the outer periphery of the float valve 40 is invisible from the first slit 61 and is hidden.

As described above, the support portion 50 in the embodiment is formed separately from the housing main body 20, and is attached to the lower opening of the housing main body 20 to define the valve chamber V, but for example, the float valve support portion may be integrally formed at a bottom portion of the housing main body. Further, the float valve support portion may be provided separately at a position in the middle of the housing main body in the axial direction, or the float valve support portion may be integrally formed at the position in the middle in the axial direction.

A shape and a structure of the float valve support portion are not limited to those described above as long as the float valve support portion includes a support wall, a side wall, a first slit, a second slit, and an elastic piece provided with a first extending portion and a second extending portion. For example, the elastic piece 65 in the embodiment has a so-called cantilever shape in which a base end side of the first extending portion 67 is fixed to the side wall 53, but may have a so-called double-supported beam shape in which both ends of the first extending portion constituting the elastic piece are fixed to the side wall 53 (described in other embodiments). A portion of the first slit 61 extending beyond the second extending portion 69, the rib 73 provided on the inner edge portion of the first slit 61, the protrusion 71 of the elastic piece 65, and the like may not be present. Further, in the embodiment, four first slits 61, four second slits 63, and four elastic pieces 65 are provided, but the numbers of the first slits, the second slits, and the elastic pieces may be one, two, three, or five or more, and are not particularly limited.

Shapes and structures of the housing main body, the cover, the float valve, and the like other than the float valve support portion in the valve device according to the present invention are not limited to those described above.

Next, operations and effects of the valve device 10 having the above configurations according to the present invention will be described.

As shown in FIG. 3, in a state where a fuel liquid level in the fuel tank 1 does not rise and the float valve 40 is not immersed in the fuel, the float valve 40 is lowered in the valve chamber V, the valve head 41 separates from the second valve seat 24b, and a lower opening of the valve hole 24 is opened. The protrusions 71 of the plurality of elastic pieces 65 are supported in contact with the bottom surface 40a of the float valve 40.

In the state shown in FIG. 3, when the vehicle turns in a curve, travels on a road, a slope, or the like having unevenness, or falls down due to an accident, the fuel in the fuel tank 1 oscillates vigorously and the fuel liquid level rises, the float valve 40 is raised due to an urging force of the urging spring 80 and buoyancy of the float valve 40 itself, the valve head 41 is brought into contact with an inner peripheral edge portion of the second valve seat 24b, and the lower opening of the valve hole 24 is closed, so that the fuel is suppressed from flowing into the ventilation chamber R through the valve hole 24, and the fuel can be suppressed from leaking to the outside of the fuel tank 1.

When the buoyancy is not generated because, for example, the oscillation of the fuel is stopped, the float valve 40 is lowered due to its own weight, and the bottom surface 40a is supported by the support wall 51 of the support portion 50. At this time, in the valve device 10, the elastic piece 65 is formed in the support portion 50, and the elastic piece 65 is provided with the second extending portion 69 extending on the inner diameter side with respect to the side wall 53 and capable of coming into contact with the bottom surface 40a of the float valve 40. Therefore, when the float valve 40 is lowered, the second extending portion 69 of the elastic piece provided on the support portion 50 is brought into elastic contact with the bottom surface 40a of the float valve 40 (here, the bottom surface 40a of the float valve 40 is brought into elastic contact with the protrusion 71 provided on the second extending portion 69), and thus it is possible to suppress a hammering sound when the float valve 40 is lowered.

For example, when the fuel is supplied into the fuel tank 1, a fluid F such as air or fuel vapor in the fuel tank 1 is blown up and flows into the first valve chamber V from below the valve device 10 through a slit or the like, as indicated by an arrow in FIG. 3. When the fuel vapor increases in the fuel tank 1 due to traveling of the vehicle or the like, the fluid F, which is the fuel vapor, is also blown up to flow into the first valve chamber V from below the valve device 10 through the slit or the like.

At this time, as shown in FIGS. 5 and 6, the elastic piece 65 is defined by the first slit 61 and the second slit 63 in the support portion 50, the second slit 63 is formed in the side wall 53, and the support wall 51 is formed with the first slit 61 alone.

Therefore, as compared with the structure in which the first arc-shaped split groove and the second arc-shaped split groove are formed in the surface portion of the case facing the bottom portion of the float body as in the fuel tank device of Patent Literature 1, an opening region of the support wall 51, which is disposed to face a bottom surface 40a side of the float valve 40 and serves as a fluid path through which a fluid can flow can be narrowed. As a result, for example, when the fluid F such as air is blown up to flow into the valve chamber V from below the valve device 10 during fuel supply to the fuel tank 1 or the like, the fluid F mainly flows into the valve chamber V from the first slit 61 and then passes through the outer periphery of the float valve 40 to flow toward the upper side of the valve chamber as indicated by an arrow F1 in FIG. 10, so that it is possible to suppress the flow of the fluid F toward an inside of the support portion 50 (that is, the flow of the fluid F toward the bottom surface 40a side of the float valve 40). Therefore, when the fluid F is blown up during fuel supply or the like, pushing-up due to the fluid from the bottom surface 40a side of the float valve 40 in the case is suppressed, and thus it is possible to make the float valve 40 less likely to float.

Therefore, it is easy to set the float valve 40 so as not to float when a flow rate of a fluid is equal to or less than a predetermined value, and to function the valve device 10 as a cut valve, an overfill suppression valve, or the like.

In the embodiment, the support wall 51 is provided with the rib 73 protruding toward the valve chamber V side and extending along the inner edge portion of the first slit 61. Therefore, when the fluid F is blown up to flow into the valve chamber during fuel supply or the like, even if the fluid F tries to flow into the bottom surface 40a side of the float valve 40 as indicated by an arrow F2 in FIG. 10, the fluid F is blocked by the rib 73, and thus the float valve 40 can be made more less likely to float.

Further, in the embodiment, the support portion 50 is provided separately from the housing 15, and the support portion 50 is attached to the housing 15 such that the outer peripheral surface 67c of the elastic piece 65 faces the inner peripheral surface 21d of the housing 15 (see FIG. 10). Therefore, a deflection direction of the elastic piece 65 can be restricted to be the axial direction of the housing 15 as indicated by the arrow D in FIG. 5, and breakage or the like of the elastic piece 65 can be suppressed to enhance an effect of suppressing the hammering sound by the elastic piece 65.

In the embodiment, the rotation restricting portion (here, the protruding piece 29 on the housing 15 side and the groove portion 45 on the float valve 40 side) that restricts the rotation of the float valve 40 is provided between the housing 15 and the float valve 40, and the guide rib 43 extending along the axial direction of the float valve 40 is provided on the outer periphery of the float valve 40. In the state where the rotation of the float valve 40 is restricted by the rotation restricting portion, as shown in FIG. 4, the guide rib 43 is disposed so as to overlap with the second extending portion 69 when the support portion 50 is viewed from the bottom surface side of the valve device 10. Therefore, when the fluid F is blown up and flows through the first slit 61, the fluid. F is less likely to collide with the guide rib 43 of the float valve 40, and thus the float valve 40 can be made further less likely to float.

Further, in the embodiment, as shown in FIGS. 5 and 7, both ends of the rib 73 are not connected to the side wall 53. Therefore, even if the fuel is accumulated on the support wall 51 of the support portion 50, the fuel passes through the gap 73c between both ends of the rib 73 and is discharged through the first slit 61, and thus the fuel can be easily discharged to an outside of the valve chamber through the first slit 61.

In the embodiment, as shown in FIGS. 7 and 8, the first slit 61 extends beyond the second extending portion 69. Therefore, the first slit 61 can be formed to be long, and thus the fuel accumulated on the support wall 51 of the support portion 50 can be more easily discharged to the outside of the valve chamber through the first slit 61. When the fluid F is blown up during fuel supply or the like, the fuel can easily pass through the first slit 61, FIGS. 11 to 18 show another embodiment of a valve device according to the present invention. Substantially the same parts as those in the above embodiment are denoted by the same reference signs, and description thereof will be omitted.

Figure 11:
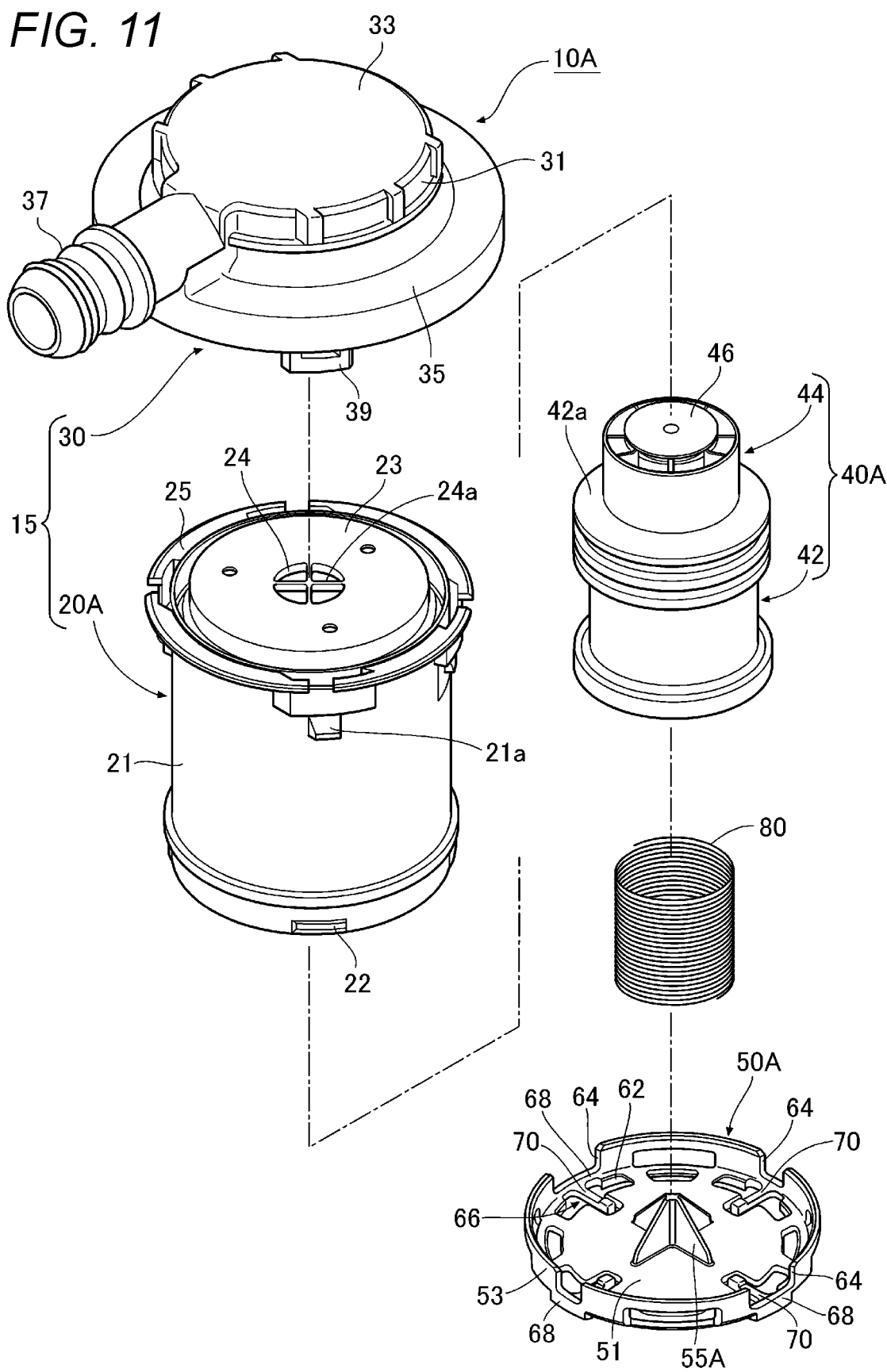
FIG. 11 is an exploded perspective view showing another embodiment of a valve device according to the present invention.

As shown in FIG. 11, with respect to a valve device 10A in the embodiment, shapes and structures of a housing main body 20A, a float valve 40A, and a float valve support portion 50A (hereinafter, also simply referred to as the "support portion 50A") are mainly different from those in the above embodiment.

Figure 14:
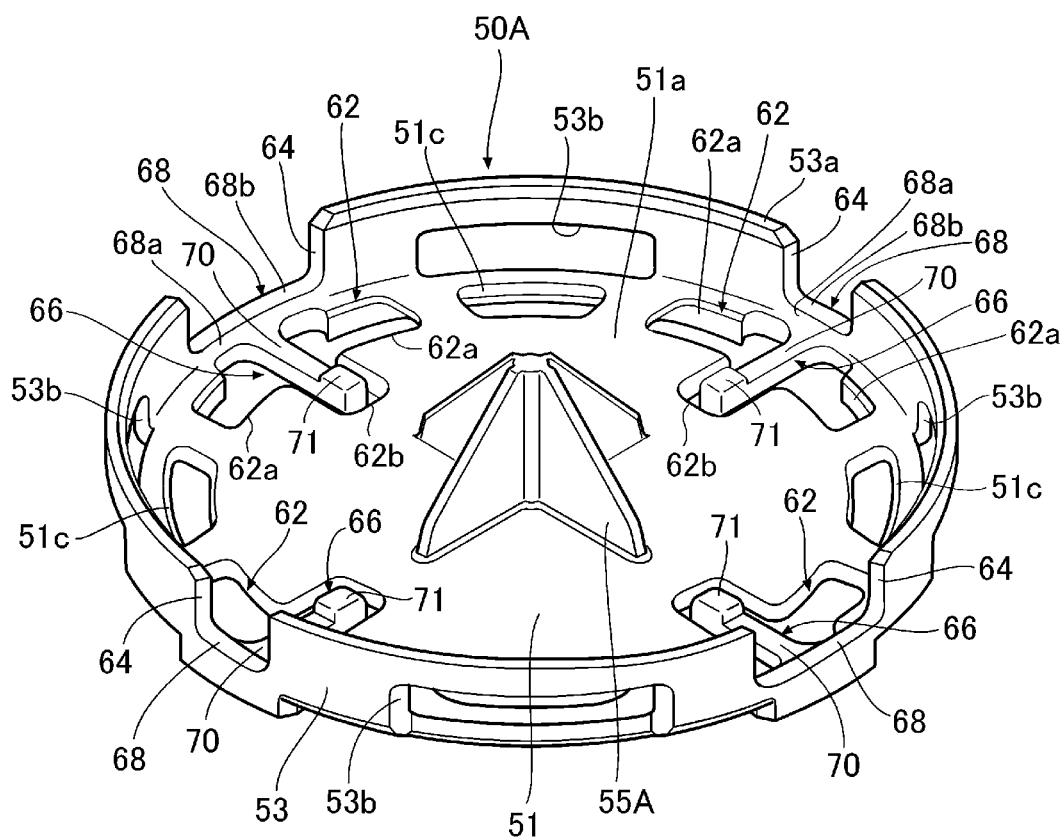
FIG. 14 is a perspective view of a float valve support portion constituting the same valve device.

A plurality of locking protrusions 22 for attaching the support portion 50A protrude on a lower outer periphery of the peripheral wall 21 of the housing main body 20A at equal intervals in a peripheral direction. A substantially cross-shaped rib 24a is provided in an inner periphery of the valve hole 24 formed in the partition wall 23 of the housing main body 20A. Further, as shown in FIG. 14, a plurality of position restricting ribs 26 extending in a form of ridges along an axial direction are provided in the inner periphery of the peripheral wall 21 at equal intervals in the peripheral direction.

Figure 13:
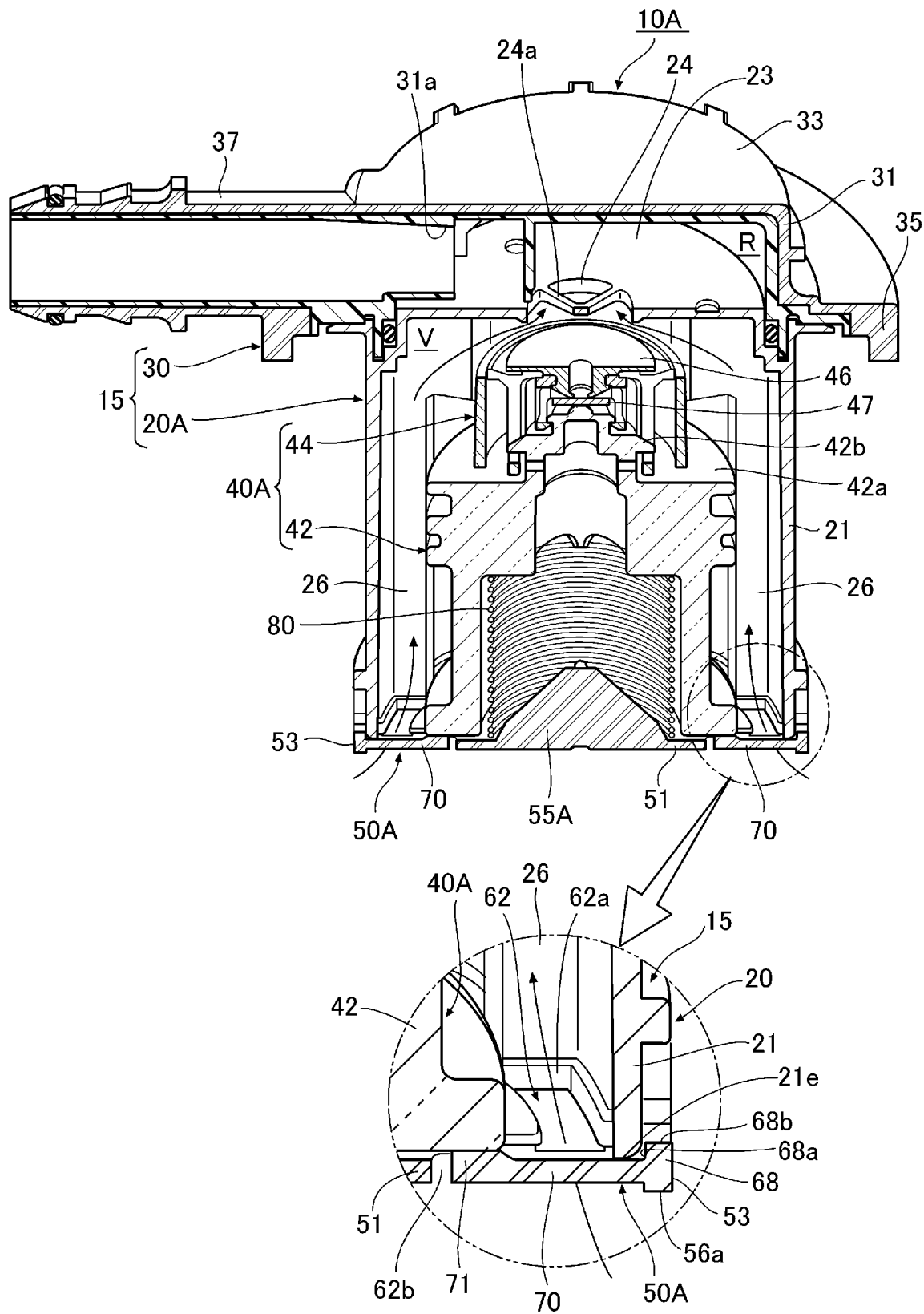
FIG. 13 is a cross-sectional perspective view of the same valve device.

As shown in FIG. 13, the float valve 40A includes a float main body 42 that generates buoyancy when immersed in a fuel, and a seal member 44 that is mounted on an upper side of the float main body 42, raised and lowered relative to the float main body 42, and brought into contact with and separated from the valve hole 24.

As shown in FIG. 13, in the float main body 42, an assembly portion 42b protrudes from a center of a ceiling wall 42a on an upper side of the float main body 42. The seal member 44 is disposed on an outer periphery of the assembly portion 42b, and is assembled in a retaining and holding state such that the seal member 44 can be raised and lowered by a predetermined distance with respect to the float main body 42. A seal valve body 46 made of an elastic material such as rubber or elastic elastomer is mounted on an upper side of the seal member 44. Further, an intermediate valve body 47 is supported between the assembly portion 42b and the seal valve body 46 in a tiltable manner. The intermediate valve body 47 is normally in contact with a lower end portion of the seal valve body 46 to close a lower opening of the seal valve body 46, and opens the lower opening when the float main body 42 is lowered with respect to the seal member 44.

As shown in FIG. 13, in a state where the float valve 40A is accommodated and disposed in the valve chamber V, the plurality of position restricting ribs 26 are disposed on the outer periphery of the float valve 40A, and a position of the float valve 40A is restricted such that the float valve 40A does not move in a radial direction of the housing 15. The position restricting rib 26 also serves as a guide when the float valve 40A is raised and lowered.

Next, the support portion 50A will be described in detail with reference to FIGS. 14 to 17.

Figure 15:
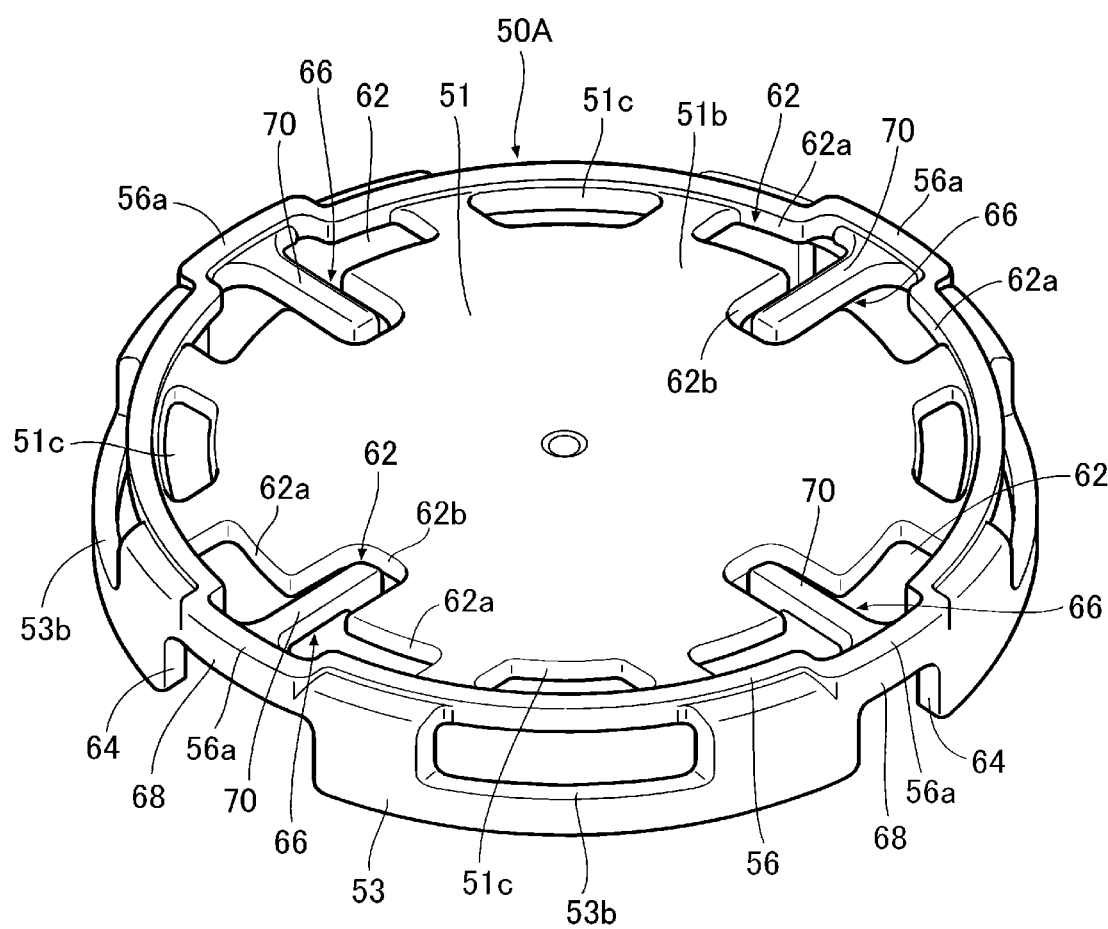
FIG. 15 is a perspective view of the same float valve support portion as viewed from a direction different from that of FIG. 14.
Figure 17:
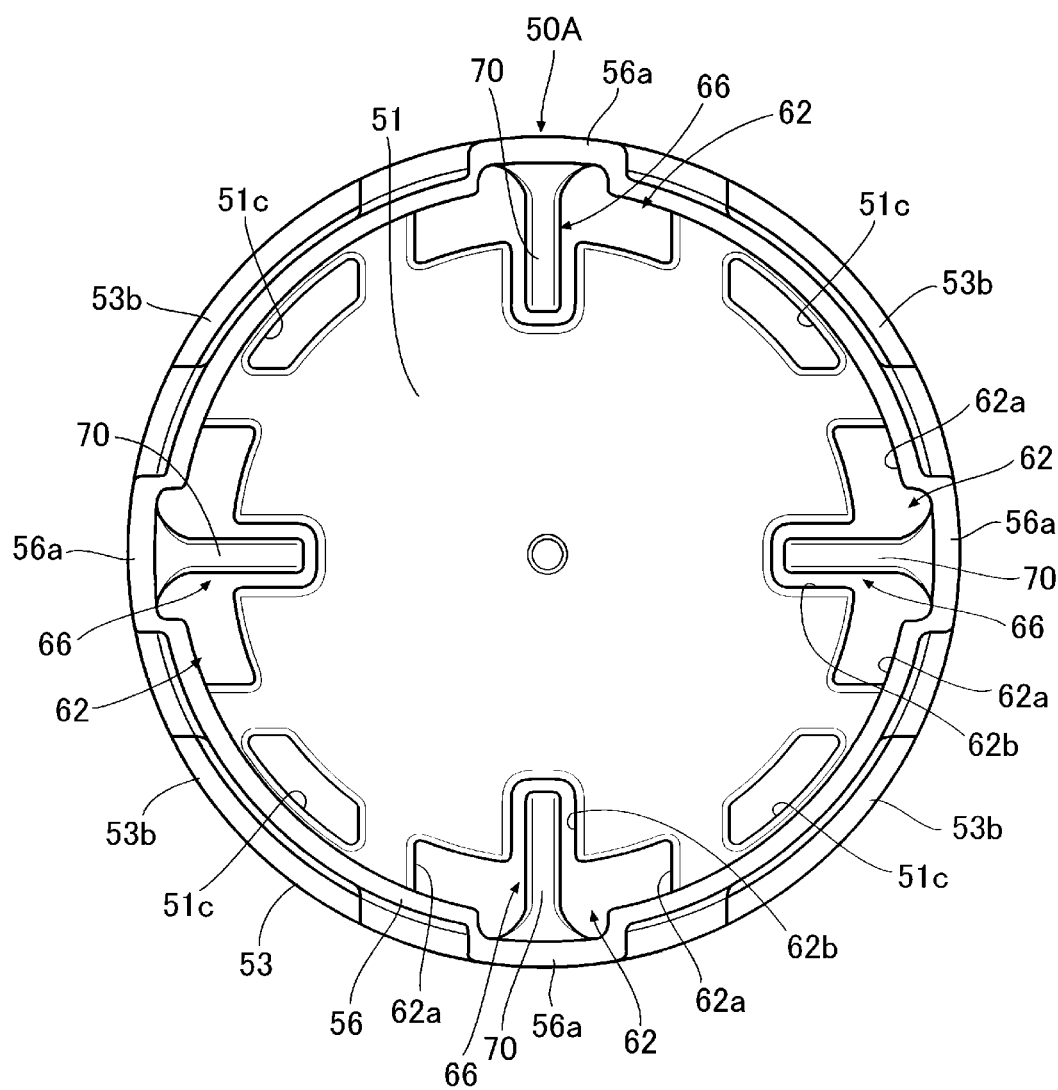
FIG. 17 is a bottom view of the same float valve support portion.
Figure 18:
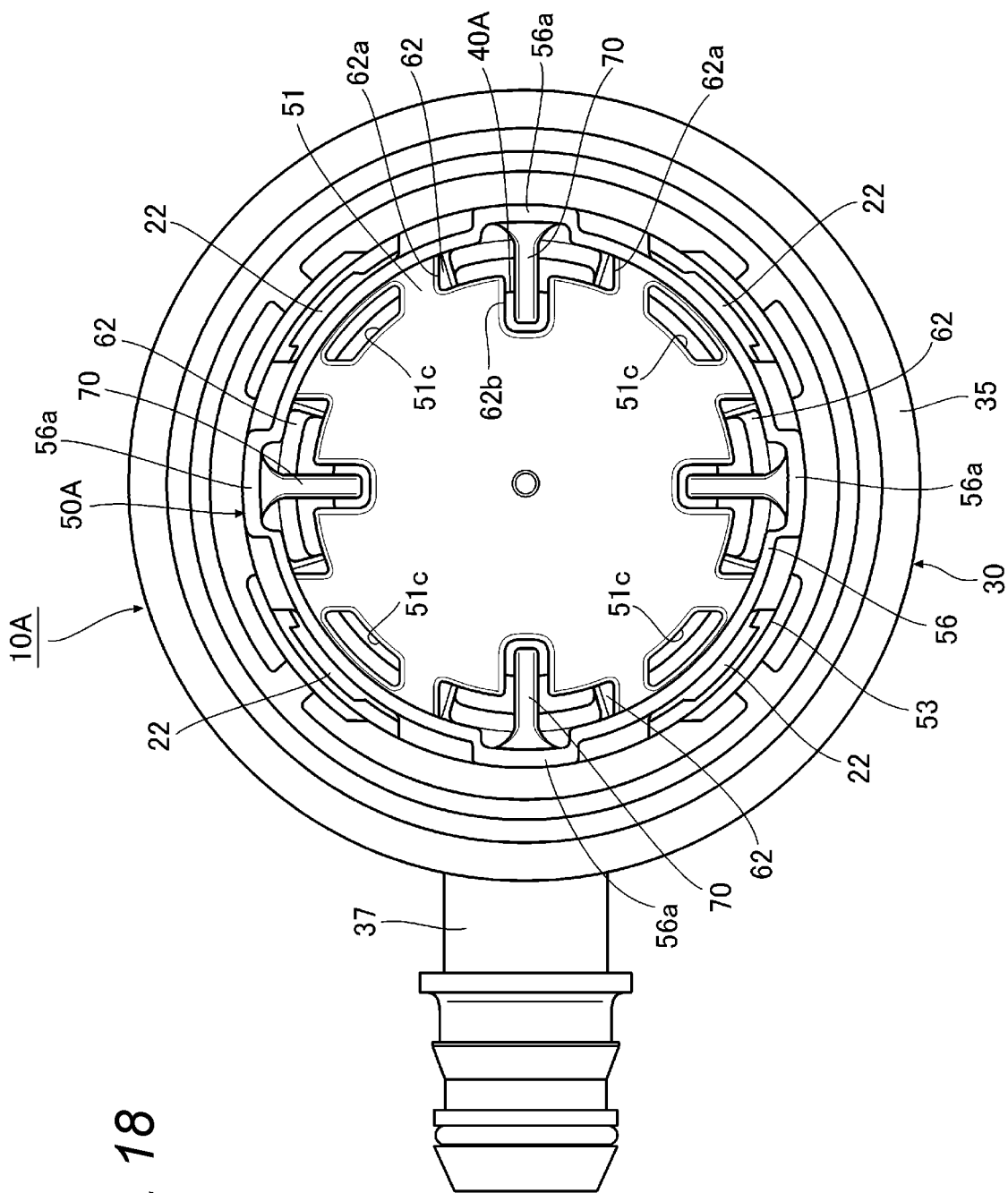
FIG. 18 is a bottom view of the same float valve device.

The support portion 50A is provided separately from the housing 15 as in the above embodiment. As shown in FIG. 15, the side wall 53 of the support portion 50A includes an annular protrusion 56 surrounding an outer periphery of the support wall 51 at a lower end portion of the side wall 53. The side wall 53 is erected from the support wall 51 via the annular protrusion 56. The annular protrusion 56 has a shape protruding downward from an outer surface Sib of the support wall 51. Further, a part of an outer periphery of the annular protrusion 56 is provided with protruding portions 56a protruding outward from an outer peripheral surface 21e (see FIG. 13) of a lower end portion of the peripheral wall 21 of the housing main body 20. As shown in FIG. 17, in a case of the embodiment, four protruding portions 56a are provided at equal intervals in a peripheral direction of the annular protrusion 56.

As shown in FIG. 13, the side wall 53 of the support portion 50A is disposed on an outer periphery of the lower end portion of the peripheral wall 21 of the housing main body 20A. That is, the inner periphery of the side wall 53 in the embodiment is disposed to face the outer peripheral surface 21e of the lower end portion of the peripheral wall 21.

Figure 12:
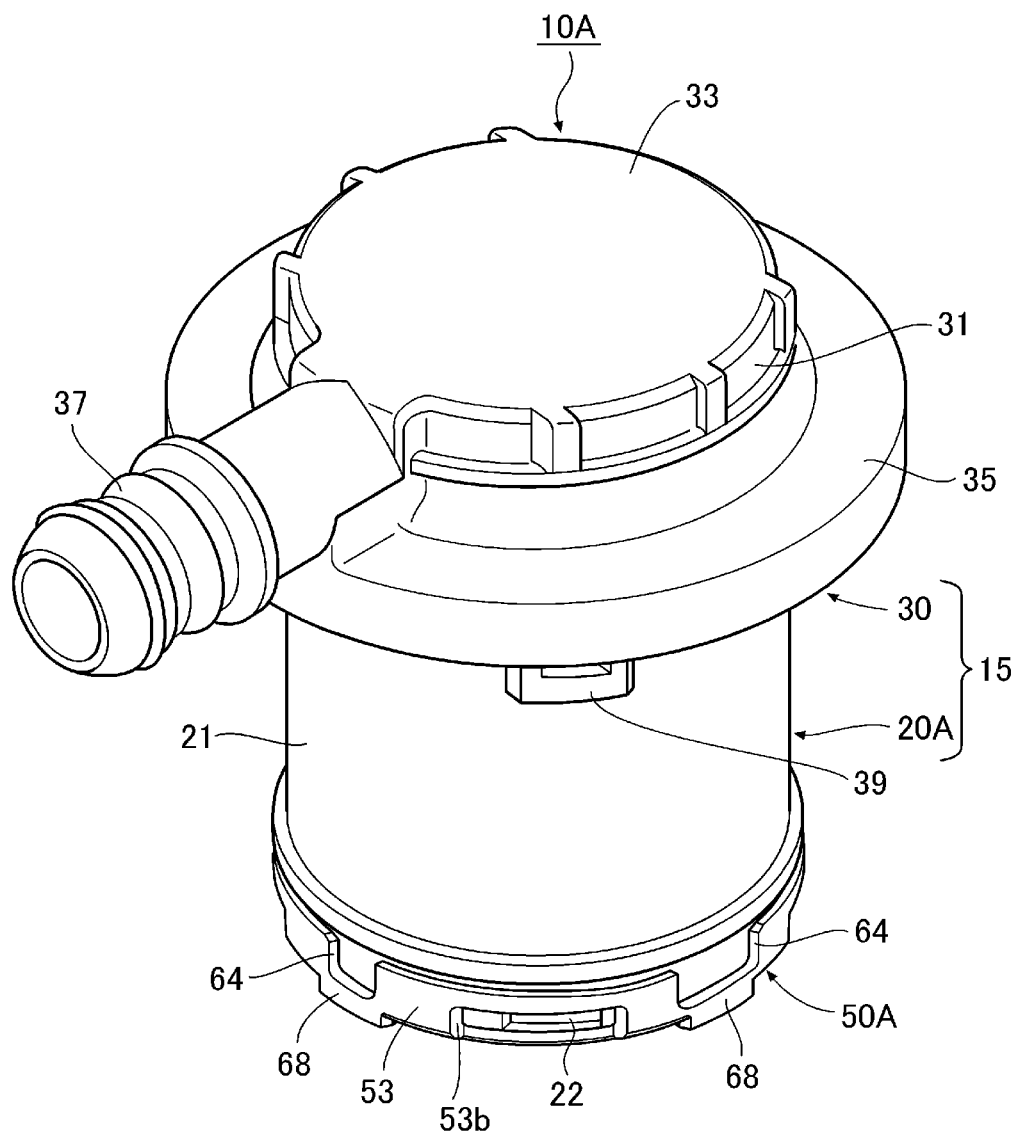
FIG. 12 is a perspective view of the same valve device.

Further, as shown in FIG. 14, locking holes 53b each having an elongated hole shape extending along a peripheral direction of the side wall 53 are formed in the side wall 53 at equal intervals in the peripheral direction. Here, as shown in FIG. 15, the locking hole 53b is located in the side wall 53 and between the protruding portions 56a and 56a provided on the annular protrusion 56. The side wall 53 covers the outer periphery of the lower end portion of the peripheral wall 21, and the locking protrusion 22 is locked to the corresponding locking hole 53b, whereby the support portion 50A is attached to the housing main body 20A as shown in FIG. 12.

Further, as shown in FIGS. 14 and 15, through holes 51c are formed in an outer peripheral edge portion of the support wall 51, and are formed respectively at positions corresponding to the locking holes 53b formed in the side wall 53. A spring support seat 55A, which is larger than the spring support seat 55 in the above embodiment and has a protrusion shape with a cruciform cross section, protrudes from the center of the inner surface 51a of the support wall 51.

As shown in FIG. 15, second slits 64 are formed in the side wall 53, and are formed respectively at positions corresponding to the plurality of protruding portions 56a provided on the annular protrusion 56. As shown in FIG. 14, the second slit 64 has a recessed groove shape that is opened upward and extends from the upper end surface 53a of the side wall 53 toward a lower end side by a predetermined depth and along the peripheral direction of the side wall 53 by a predetermined length.

Further, first slits 62 are formed in the outer peripheral edge portion of the support wall 51, and are formed respectively at positions corresponding to the second slits 64 formed in the side wall 53 (see FIG. 14).

As shown in FIGS. 14 and 15, a plurality of elastic pieces 66 are defined by the second slits 64 and the first slits 62, respectively. The elastic piece 66 includes a first extending portion 68 and a second extending portion 70, similarly to the elastic piece 65 in the above embodiment.

As shown in FIG. 14, the first extending portion 68 is provided at the lower end portion of the side wall 53 via the second slit 64. More specifically, as shown in FIG. 15, the first extending portion 68 is provided on the protruding portion 56a provided on the annular protrusion 56 constituting the side wall 53. The first extending portion 68 extends along the side wall 53 by a predetermined length, and both ends thereof in an extending direction are supported by the side wall 53. That is, both ends of the first extending portion 68 are fixed ends fixed to the side wall 53, and form a double-supported beam shape. An inner peripheral surface 68a of the first extending portion 68 is disposed to face the outer peripheral surface 21e of the lower end portion of the housing main body 20A in a state where the support portion 50A is attached to the housing main body 20A (see FIG. 13).

Figure 16:
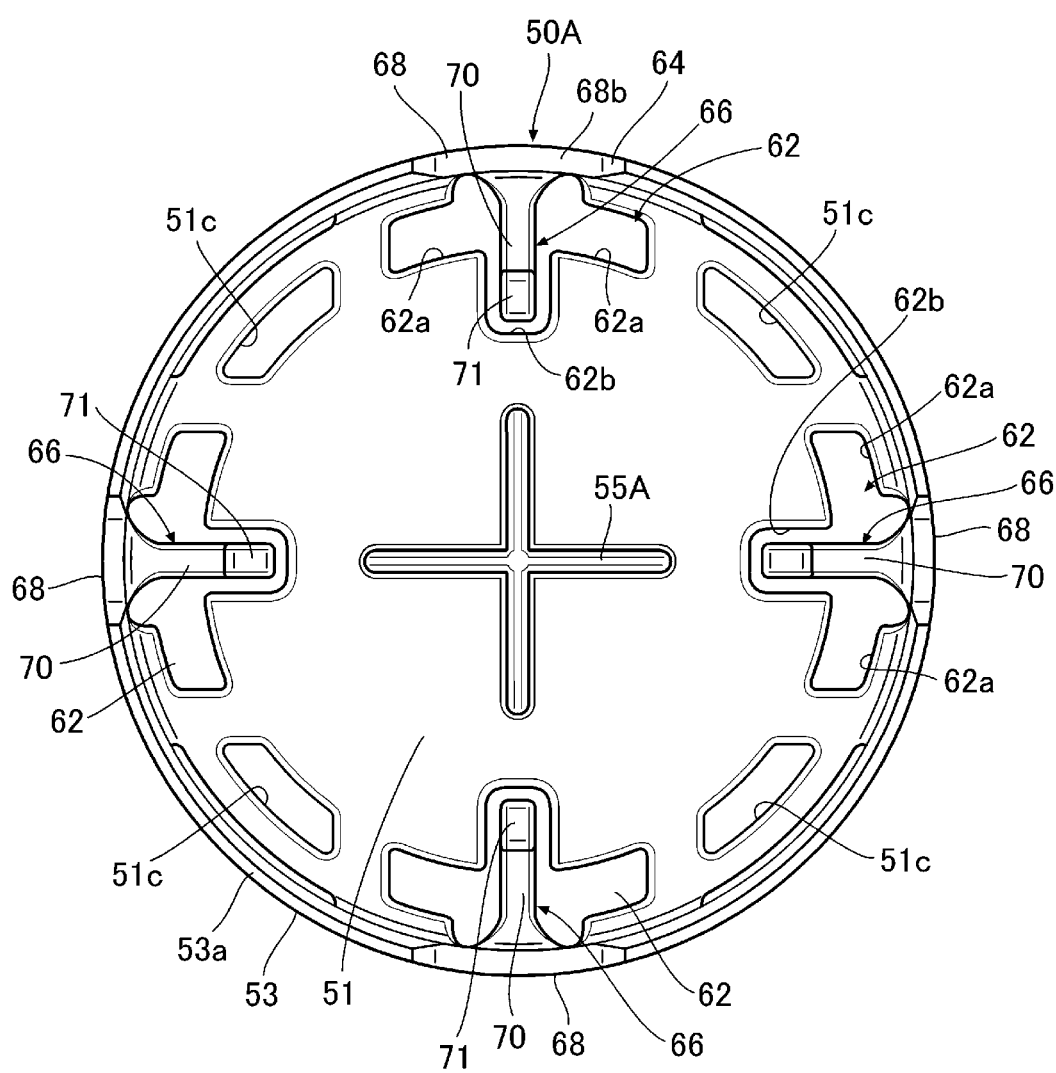
FIG. 16 is a plan view of the same float valve support portion.

As shown in FIG. 14, the second extending portion 70 extends by a predetermined length toward a center in a radial direction of the support wall 51 from a position at the inner peripheral surface 68a at a center in the extending direction of the first extending portion 68 and lower than an upper end surface 68b of the first extending portion 68. Further, as shown in FIG. 16, among the plurality of second extending portions 70, predetermined second extending portions 70 (the second extending portions 70 and 70 located on both left and right sides in FIG. 16) extend longer than the corresponding first extending portions 68. As shown in FIG. 13, in the state where the support portion 50A is attached to the housing main body 20A, the lower end portion of the peripheral wall 21 of the housing main body 20A is in contact with a base end of the second extending portion 70 on a lower side of the upper end surface 68b of the first extending portion 68.

As shown in FIGS. 16 and 17, the first slit 62 formed around the second extending portion 70 has first openings 62a and 62a disposed on both sides of a base end side of the second extending portion 70, and a second opening 62b disposed on a tip end side of the second extending portion 70. The first opening 62a is disposed in the outer peripheral edge portion of the support wall 51, and has a substantially strip shape extending with a constant width along the inner periphery of the side wall 53. An opening area of the second opening 62b is smaller than a total opening area of the first openings 62a and 62a (see FIGS. 16 and 17).

The float valve 40A in the embodiment is restricted from moving in the radial direction by the plurality of position restricting ribs 26 as described above, and as shown in FIG. 18, an outer periphery of the float valve 40A is exposed from the second opening 62b (the outer periphery of the float valve 40A is visible from the second opening 62b) but is not exposed from the first opening 62a (the outer periphery of the float valve 40A is invisible from the first opening 62a) when the support portion 50A is viewed from a bottom surface side.

Next, operations and effects of the valve device 10A having the above configurations according to the present invention will be described.

That is, as shown in FIGS. 14 and 15, the first extending portion 68 in the embodiment has a shape in which both ends are supported, and thus the first extending portion 68 can be made to obtain appropriate rigidity, and can be made less likely to be broken.

In the embodiment, the support portion 50A is provided separately from the housing 15, and is attached to the housing 15 such that the inner peripheral surface 68a of the first extending portion 68 of the elastic piece 66 faces the outer peripheral surface 21e of the housing 15 as shown in FIG. 13.

Therefore, a length of the second extending portion 70 that extends from the first extending portion 68 can be ensured to be large, and thus the second extending portion 70 can be easily deflected and deformed, and a hammering sound when the float valve is lowered can be more suppressed.

Further, in the embodiment, the support portion 50A is provided separately from the housing 15, and the second slit 64 has a shape opened upward (see FIG. 13).

Therefore, the side wall 53 of the support portion 50A can be easily deflected, and the support portion 50A can be easily assembled to the housing 15. For example, a protrusion for suppressing rotation is provided on the housing 15 side, and the protrusion is fitted into a predetermined second slit 64, so that the support portion 50A can be assembled to the housing 15 in a state of being suppressed from rotating.

In the embodiment, as shown in FIG. 16, the predetermined second extending portion 70 extends longer than the first extending portion 68. Therefore, the second extending portion 70 can be easily deflected and deformed while appropriately ensuring the rigidity of the first extending portion 68, and the hammering sound when the float valve is lowered can be further suppressed.

Further, as shown in FIGS. 13 to 15, in the embodiment, a part of the outer periphery of the support wall 51 is provided with the protruding portion 56a protruding outward from an outer periphery of a lower end edge portion of the housing 15, the protruding portion 56a is provided with the first extending portion 68, and the second extending portion 70 extends from the inner peripheral surface 68a of the first extending portion 68.

According to the above aspect, the second extending portion 70 extends from the inner peripheral surface 68a of the first extending portion 68 protruding outward, and thus the length of the second extending portion 70 can be ensured to be large, the second extending portion 70 can be easily deflected and deformed, and the hammering sound when the float valve is lowered can be more suppressed. Even if the float valve support portion is not separate from the housing, the second extending portion 70 can be secured to be long to facilitate deflection and deformation.

As shown in FIGS. 16 and 17, the first slit 62 has the first openings 62a and 62a disposed on both sides of the base end side of the second extending portion 70, and the second opening 62b disposed on the tip end side of the second extending portion 70, and the second opening 62b has the opening area smaller than that of the first openings 62a.

According to the above aspect, the second opening 62b has the opening area smaller than that of the first openings 62a, and thus a large opening area of the first slit 62 as a ventilation path can be secured. An amount of exposure of the float valve 40A with respect to the first slit 62 can be reduced (see FIG. 18), and the float valve 40A can be made less likely to blow up.

That is, even when the fluid F such as air or fuel vapor in the fuel tank 1 is blown up from below the housing, as indicated by arrows in FIG. 13, the fluid F mainly passes through the first opening 62a of the first slit 62, flows into the valve chamber V, flows through the outer periphery of the float valve 40A, and pushing-up from below the float valve 40A by passing through the second opening 62b is suppressed. The opening area of the first opening 62a is larger than that of the second opening 62b, and thus a flow velocity of the fluid F passing through the first opening 62a is low, so that it is possible to suppress the floating of the float valve 40A.

The present invention is not limited to the embodiments described above, and various modifications can be made without departing from the gist of the present invention, and such embodiments are also included in the scope of the present invention.

EXAMPLES

The easiness of floating a float valve at the time of blowing up of a fluid was tested.

Example

A valve device according to an example provided with a float valve support portion similar to the valve device shown in FIGS. 1 to 10 was manufactured.

Comparative Example

Figure 19A:
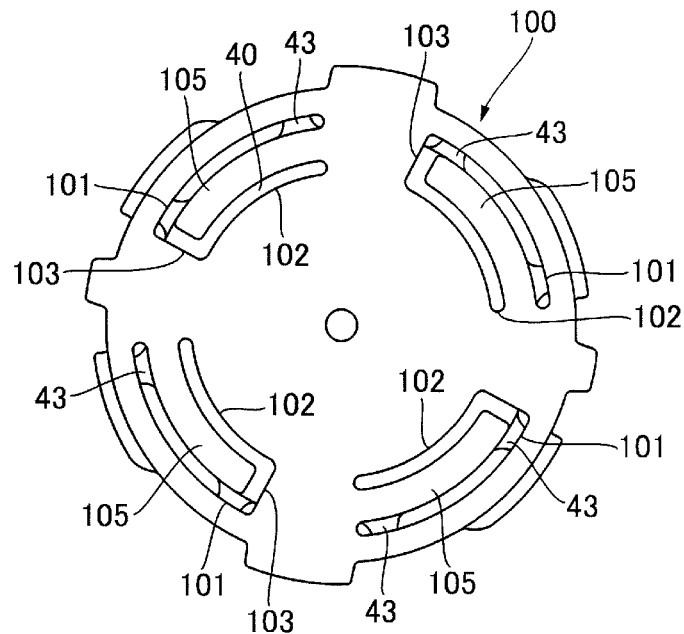
FIG. 19A is a bottom view of a float valve support portion in a comparative example.

A valve device according to a comparative example provided with a float valve support portion as shown in FIG. 19A was manufactured. That is, a float valve support portion 100 has a structure in which each elastic piece 105 is formed via a pair of arc-shaped slits 101 and 102, and a connecting slit 103 that connects the arc-shaped slits 101 and 102. Structures other than the float valve support portion are the same as those in the example. The plurality of guide ribs 43 provided on the outer periphery of the float valve are visible from the arc-shaped slit 101 located on an outer diameter side, and the float valve 40 itself is visible from the arc-shaped slit 102 located on an inner diameter side.

Test Method

Figure 19B:
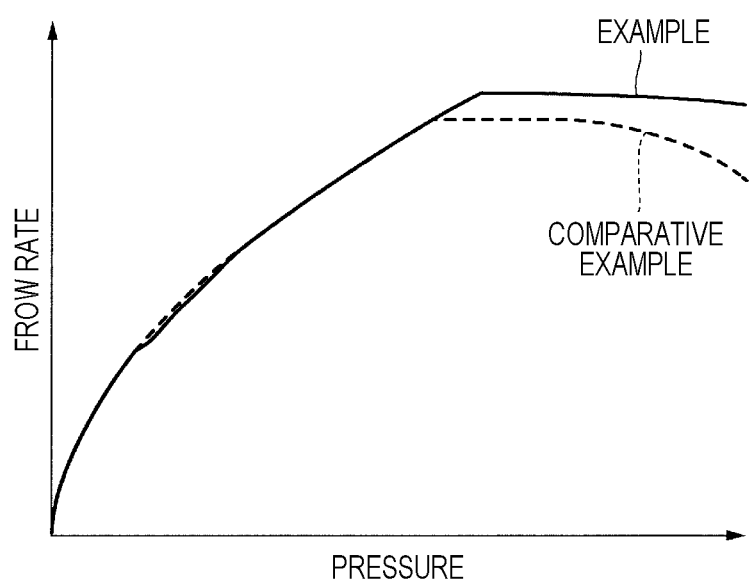
FIG. 19B is a graph showing a relationship between a pressure and a flow rate in an example and the comparative example, which is a test result of a float valve floating confirmation test.

The valve devices according to the above example and comparative example were each set in a fuel tank, and air was blown up from an air supply pipe (not shown) toward an upper side of the valve device. At this time, it was measured at what flow rate the float valve floated. The results are shown in FIG. 19B. In FIG. 19B, a graph of a relationship between a pressure and a flow rate when a horizontal axis represents a pressure and a vertical axis represents a flow rate is shown. In the graph in FIG. 19B, when the flow rate is constant, it means that the float valve floats.

As shown in the graph in FIG. 19B, the valve device according to the example has a larger position of a constant flow rate than the valve device according to the comparative example. That is, it is understood that the float valve in the valve device according to the example is less likely to float than the float valve in the valve device according to the comparative example, and an effect of the first slit 61 was confirmed.

REFERENCE SIGNS LIST

1: fuel tank
10, 10A: valve device
15: housing
20, 20A: housing main body
21: peripheral wall
23: partition wall
30: cover
40, 40A: float valve
40a: bottom surface
50: float valve support portion (support portion)
50a: bottom surface
51: support wall
53: side wall
61, 62: first slit
62a: first opening
62b: second opening
63, 64: second slit
65, 66: elastic piece
67, 68: first extending portion
67a: base end
67b: tip end
69, 70: second extending portion
71: protrusion
73: rib
80: urging spring
90: pressure adjusting valve

The invention claimed is:
1. A valve device, comprising:
a housing in which a valve chamber configured to communicate with an inside of a fuel tank on a lower side and a ventilation chamber configured to communicate with an outside of the fuel tank on an upper side are provided via a partition wall, and a valve hole configured to allow the valve chamber and the ventilation chamber to communicate with each other is formed in the partition wall;
a float valve accommodated in the valve chamber so as to be raised and lowered, and configured to open and close the valve hole; and
a float valve support portion provided on the housing and supporting the float valve, wherein
the float valve support portion includes a support wall facing a bottom surface of the float valve, a side wall erected from a peripheral edge of the support wall and facing a side surface of the float valve, a first slit formed in the support wall, a second slit formed in the side wall, and an elastic piece defined by the first slit and the second slit, the elastic piece includes a first extending portion extending along the side wall, and a second extending portion extending from the first extending portion and capable of coming into contact with the bottom surface of the float valve, and the first extending portion of the elastic piece overlaps with the side wall when viewed from a direction in which the float valve can be raised and lowered.

2. The valve device according to claim 1, wherein the support wall is provided with a rib protruding toward a side of the valve chamber and extending along an inner edge portion of the first slit.

3. The valve device according to claim 1, wherein the float valve support portion is provided separately from the housing, and is attached to the housing such that an outer peripheral surface of the first extending portion of the elastic piece faces an inner peripheral surface of the housing.

4. The valve device according to claim 1, wherein a rotation restricting portion configured to restrict rotation of the float valve is provided between the housing and the float valve, a guide rib extending along an axial direction of the float valve is provided on an outer periphery of the float valve, the guide rib is disposed so as to overlap with the second extending portion when the float valve support portion is viewed from a bottom surface side in a state where the rotation of the float valve is restricted by the rotation restricting portion, and the rotation restricting portion is configured by a protruding piece on one of the housing and the float valve, and a groove portion on another of the housing and the float valve.

5. The valve device according to claim 2, wherein both ends of the rib are not connected to the side wall.

6. The valve device according to claim 1, wherein the first slit extends beyond the second extending portion.

7. The valve device according to claim 1, wherein the first extending portion has a shape in which both ends thereof are supported.

8. The valve device according to claim 1, wherein the float valve support portion is provided separately from the housing, and is attached to the housing such that an inner peripheral surface of the first extending portion of the elastic piece faces an outer peripheral surface of the housing.

9. The valve device according to claim 1, wherein the float valve support portion is provided separately from the housing, and the second slit has a shape opened upward.

10. The valve device according to claim 1, wherein the second extending portion extends longer than the first extending portion.

11. The valve device according to claim 1, wherein a part of an outer periphery of the support wall is provided with a protruding portion protruding outward from an outer periphery of a lower end edge portion of the housing, and the protruding portion is provided with the first extending portion, and the second extending portion extends from an inner peripheral surface of the first extending portion provided on the protruding portion.

12. The valve device according to claim 1, wherein the first slit has first openings disposed on both sides of a base end side of the second extending portion, and a second opening disposed on a tip end side of the second extending portion, and the second opening has an opening area smaller than that of the first openings.

\* \* \* \* \*